(12) United States Patent
Liu et al.

(10) Patent No.: US 11,302,298 B2
(45) Date of Patent: Apr. 12, 2022

(54) SIGNAL PROCESSING METHOD AND DEVICE FOR EARPHONE, AND EARPHONE

(71) Applicant: Beijing Xiaoniao Tingting Technology Co., LTD., Beijing (CN)

(72) Inventors: Song Liu, Beijing (CN); Na Li, Beijing (CN); Bo Li, Beijing (CN)

(73) Assignee: Beijing Xiaoniao Tingting Technology Co., LTD., Beijing (CN)

( * ) Notice: Subject to any disclaimer, the term of this patent is extended or adjusted under 35 U.S.C. 154(b) by 0 days.

(21) Appl. No.: 17/180,705

(22) Filed: Feb. 19, 2021

(65) Prior Publication Data

US 2021/0264893 A1 Aug. 26, 2021

(30) Foreign Application Priority Data

Feb. 20, 2020 (CN) .......................... 202010103438.8

(51) Int. Cl.
*G10K 11/178* (2006.01)
*G01P 15/18* (2013.01)

(52) U.S. Cl.
CPC ........ *G10K 11/17854* (2018.01); *G01P 15/18* (2013.01); *G10K 11/17881* (2018.01); *G10K 2210/1081* (2013.01); *G10K 2210/3026* (2013.01); *G10K 2210/3027* (2013.01); *G10K 2210/3028* (2013.01); *G10K 2210/501* (2013.01)

(58) Field of Classification Search
CPC ..... G10K 2210/501; G10K 2210/1081; G10K 2210/3026; G10K 2210/3027
See application file for complete search history.

(56) References Cited

U.S. PATENT DOCUMENTS

| 10,721,562 | B1* | 7/2020 | Rui | ........................ H04R 3/005 |
| 2007/0033029 | A1* | 2/2007 | Sakawaki | ........ G10K 11/17885 |
| | | | | 704/233 |
| 2017/0374477 | A1 | 12/2017 | Salvatucci et al. | |
| 2018/0018954 | A1 | 1/2018 | Liu et al. | |

(Continued)

FOREIGN PATENT DOCUMENTS

| EP | 3672274 A1 | 6/2020 |
| EP | 3672274 A4 | 5/2021 |

(Continued)

OTHER PUBLICATIONS

Supplementary European Search Report in European application No. 21158473.5, dated Jul. 8, 2021.

*Primary Examiner* — Ping Lee
(74) *Attorney, Agent, or Firm* — Syncoda LLC; Feng Ma

(57) ABSTRACT

A signal processing method for an earphone includes: a motion state of a wearer of the earphone is detected by using an acceleration sensor arranged inside the earphone; a first microphone and a second microphone both arranged outside the earphone detect wind noise conditions corresponding to different frequency bands; and according to the motion state of the wearer of the earphone and the wind noise conditions corresponding to different frequency bands, operating modes of a feedforward filter and a feedback filter inside the earphone are adjusted, herein the feedforward filter and the feedback filter are configured for active noise cancellation of the earphone.

17 Claims, 9 Drawing Sheets

(56) References Cited

U.S. PATENT DOCUMENTS

2018/0122359 A1  5/2018  Liu et al.
2020/0174734 A1* 6/2020  Gomes .................. G06F 3/165

FOREIGN PATENT DOCUMENTS

| GB | 2500251 A   | 9/2013 |
|----|-------------|--------|
| JP | 2007002393 A | 1/2007 |
| WO | 2019141102 A1 | 7/2019 |

* cited by examiner

SIGNAL PROCESSING METHOD AND DEVICE FOR EARPHONE, AND EARPHONE

CROSS-REFERENCE TO RELATED APPLICATIONS

This application claims priority to Chinese Patent Application No. 202010103438.8 filed on Feb. 20, 2020, the disclosure of which is hereby incorporated herein by reference in its entirety.

BACKGROUND

Earphones are more and more widely used in our daily life because of a small size and easy to carry. In addition to using the earphone to listen to music, watch videos, etc., the earphone plays a role of isolating noise and provides a user with a quiet environment. The physical isolation of the earphone has limitations for mid frequency noise and low frequency noise, especially low frequency noise. Therefore, active noise cancellation is more and more widely used in the earphone.

SUMMARY

This disclosure relates generally to the technical field of active noise cancellation of an earphone, and more specifically to a signal processing method and device for an earphone, and an earphone.

Various embodiments of the disclosure provide a signal processing method and device for an earphone, and an earphone, which may avoid the adverse influence of the wind noise on the sense of hearing, and reduce safety problems caused by noise cancellation in motion.

According to embodiments of a first aspect of the disclosure, there is provided a signal processing method for an earphone, including:

a motion state of a wearer of the earphone is detected by using an acceleration sensor arranged inside the earphone;

a first microphone and a second microphone both arranged outside the earphone detect wind noise conditions corresponding to different frequency bands; and according to the motion state of the wearer of the earphone and the wind noise conditions corresponding to different frequency bands, operating modes of a feedforward filter and a feedback filter inside the earphone are adjusted, herein the feedforward filter and the feedback filter are configured for active noise cancellation of the earphone.

According to embodiments of a second aspect of the disclosure, there is provided a signal processing device for an earphone, including:

a motion state detection module is configured to detect a motion state of a wearer of the earphone by using an acceleration sensor arranged inside the earphone;

a wind noise detection module is configured to detect, by two microphones both arranged outside the earphone, wind noise conditions corresponding to different frequency bands; and a noise cancellation control module is configured to adjust, according to the motion state of the wearer of the earphone and the wind noise conditions corresponding to different frequency bands, operating modes of a feedforward filter and a feedback filter inside the earphone, herein the feedforward filter and the feedback filter are configured for active noise cancellation of the earphone.

According to embodiments of a third aspect of the disclosure, there is provided an earphone, including: an acceleration sensor arranged inside the earphone, a first microphone and a second microphone both arranged outside the earphone, and a feedforward filter and a feedback filter inside the earphone; herein the earphone is further provided therein with the above signal processing device for an earphone.

Compared with the related art, the signal processing method and device for an earphone and the earphone provided by the embodiments of the disclosure consider the motion state of the wearer and wind noise conditions corresponding to different frequency bands together, when performing active noise cancellation control on the filter group inside the earphone, so that the user in motion may perceive the useful outside noise, by adjusting the operating modes of the feedforward filter and the feedback filter inside the earphone, thereby avoiding safety problems; and when there is wind noise, the noise cancellation processing of the feedforward filter is controlled to avoid the frequency band where the wind noise is located, thereby avoiding the adverse influence of the wind noise on the sense of hearing.

Various embodiments of the disclosure also provide a method and device for detecting wind noise, which may reduce the misjudgment of the wind noise effectively and increase the accuracy of detecting the wind noise.

According to embodiments of a fourth aspect of the disclosure, there is provided a method for detecting wind noise, including:

according to time domain signals collected by a first microphone and a second microphone arranged outside an earphone, frequency domain signals of the first microphone and the second microphone at each of frequency points are acquired;

frequency bands of the signals are divided into three frequency bands including a low frequency band, a mid frequency band and a high frequency band, and the average correlation of signals of the two microphones corresponding to each of the three frequency bands including the low frequency band, the mid frequency band and the high frequency band respectively, and an average energy of the signals of the first microphone corresponding to each of the three frequency bands are acquired according to the acquired frequency domain signals of the first microphone and the second microphone at each of frequency points; and it is determined, according to the acquired average correlations and average energies, whether there is wind noise in the three frequency bands, and intensities of the wind noise in the three frequency bands.

According to embodiments of a fifth aspect of the disclosure, there is provided a device for detecting wind noise, including:

a signal acquiring unit is configured to acquire, according to time domain signals collected by a first microphone and a second microphone arranged outside an earphone, frequency domain signals of the first microphone and the second microphone at each of frequency points;

a frequency band dividing unit is configured to divide frequency bands of the signals into three frequency bands including a low frequency band, a mid frequency band and a high frequency band;

an average correlation acquiring unit is configured to acquire, according to the acquired frequency domain signals of the first microphone and the second microphone at each of frequency points, an average correlation of signals of the two microphones corresponding to each of the three frequency bands including the low frequency band, the mid frequency band and the high frequency band respectively;

an average energy acquiring unit is configured to acquire, according to the acquired frequency domain signals of the first microphone and the second microphone at each of frequency points, an average energy of the signals of the first microphone corresponding to each the three frequency bands including the low frequency band, the mid frequency band and the high frequency band respectively; and a wind noise determination unit is configured to determine, according to the acquired average correlations and average energies, whether there is wind noise in the three frequency bands, and intensities of the wind noise in the three frequency bands.

According to embodiments of a sixth aspect of the disclosure, there is provided a non-transitory computer-readable storage medium having stored thereon instructions that, when executed by a processor, cause the processor to perform a signal processing method for an earphone, the method including:

detecting a motion state of a wearer of the earphone by using an acceleration sensor arranged inside the earphone;

detecting wind noise conditions corresponding to different frequency bands by using a first microphone and a second microphone both arranged outside the earphone; and adjusting, according to the motion state of the wearer of the earphone and the wind noise conditions corresponding to different frequency bands, operating modes of a feedforward filter and a feedback filter inside the earphone, wherein the feedforward filter and the feedback filter are configured for active noise cancellation of the earphone.

The method and device for detecting wind noise provided by the embodiments of the disclosure consider both the correlation of signals of the two microphones and energy of signals of the microphones when band-wise determining wind noise, band-wise detect wind noise conditions according to the correlation of signals of the feedforward microphone and the talk microphone at different frequency bands as well as energy of the signal of the feedforward microphone at a corresponding frequency band, which may reduce the misjudgment of the wind noise effectively and increase the accuracy of detecting the wind noise.

DETAILED DESCRIPTION

Figure 1:
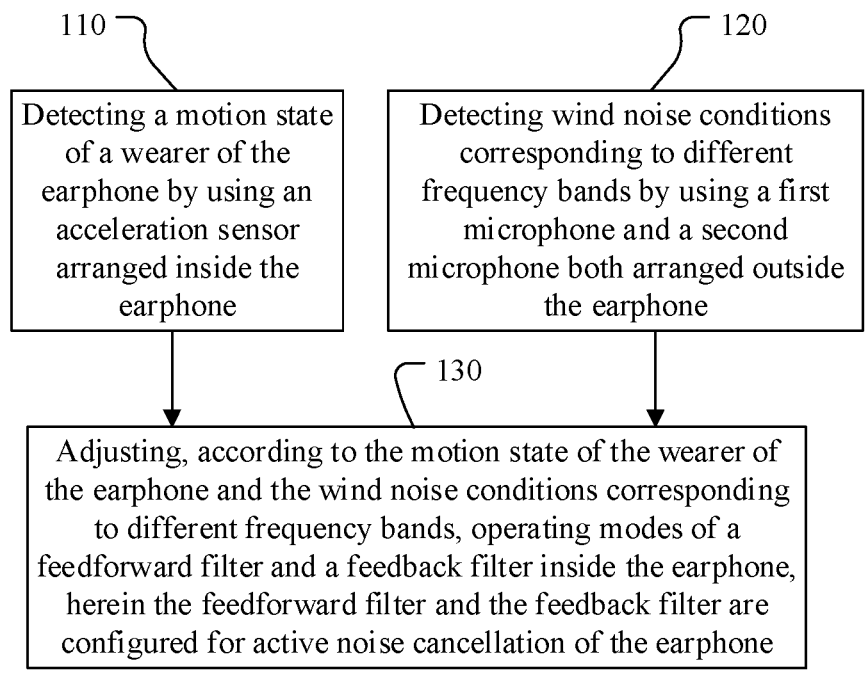
FIG. 1 is a schematic flowchart of a signal processing method for an earphone according to an embodiment of the disclosure.

In order to make the objectives, technical solutions and advantages of the disclosure clearer, the embodiments of the disclosure will be further described in detail below with reference to the drawings. However, it should be understood that these descriptions are exemplary only, and are not intended to limit the scope of the disclosure. In addition, in the following descriptions, descriptions of well-known structures and technologies are omitted to avoid obscuring the concept of the disclosure unnecessarily.

The terms used herein are intended to describe specific embodiments only, and are not intended to limit the disclosure. The words "a", "an" and "the" etc. used herein shall also include the meanings of "multiple" and "plural", unless indicated clearly by the context otherwise. Furthermore, the terms "include", "including", etc. used herein indicate the presence of the described features, steps, operations and/or components, but do not exclude the presence or addition of one or more other features, steps, operations or components.

All the terms (including technical and scientific terms) used herein have meanings generally understood by those skilled in the art, unless defined otherwise. It should be noted that the terms used herein should be interpreted as having meanings consistent with the context of the description, and should not be interpreted in an idealized or overly rigid manner.

Some block diagrams and/or flowcharts are shown in the drawings. It should be understood that some blocks in the block diagram and/or flowchart or combination thereof may be implemented by computer program instructions. These computer program instructions may be provided to a processor of a general-purpose computer, a special-purpose computer or other programmable data processing device, so that these instructions may create devices for implementing the functions/operations described in these block diagrams and/or flowcharts when being executed by the processor.

Therefore, technologies of the disclosure may be implemented in the form of hardware and/or software (including firmware, microcode, etc.). Furthermore, the technologies of the disclosure may take the form of a computer program product on a computer-readable storage medium storing instructions, and the computer program product may be used by an instruction execution system or in combination with the instruction execution system. In the context of the disclosure, the computer-readable storage medium may be any medium that may contain, store, transfer, propagate or transmit instructions. For example, the computer-readable storage medium may include, but is not limited to, an electric, magnetic, optical, electromagnetic, infrared or semiconductor system, device, component or propagation medium. Specific examples of the computer-readable storage medium include: magnetic storage devices such as magnetic tape or hard disk (HDD); optical storage devices such as optical disk (CD-ROM); memory such as Random Access Memory (RAM) or flash memory; and/or wired/wireless communication link.

A principle of active noise cancellation is to generate a signal of which the amplitude is close to the amplitude of environmental noise and the phase is opposite to the phase of the environmental noise, to offset the influence of the environmental noise. However, most of the active noise cancellation technologies currently used in the earphone are relatively simple and consider fewer external influence factors. Even if there is a method for adaptively adjusting the noise cancellation level according to the amplitude of the environmental noise, the existing noise cancellation algorithm often fails to consider the presence of wind noise and the situation when there is wind noise and the user is in motion.

For example, the user may be at a higher noise cancellation level during walking or running, besides, with the physical isolation of the earphone to the environmental noise, which causes being unable to hear the environmental noise, such as bicycles or electric vehicles, or sound or whistle of a car driving by, which causes safety problems. Therefore, it needs to adjust the noise cancellation frequency band according to whether a wearer of the earphone is in a motion state, so that the useful external noise may be perceived while ensuring noise cancellation.

Furthermore, because the wind noise is a random signal without a fixed phase, when according to the existing noise cancellation algorithm, after a feedforward microphone simply acquires the external sound signal and superimposes it reversely, the wind noise may not be eliminated or may even be amplified, and when there is large wind noise, it will seriously affect the sense of hearing. Therefore, the wind noise also needs to be considered when performing noise cancellation processing.

An active noise cancellation earphone usually has a fixed noise cancellation mode, and the noise cancellation effect thereof cannot be selected intelligently according to actual conditions. When a user is in motion, especially when the user selects a higher noise cancellation level, it will cause a greater level of noise cancellation added based on the physical isolation. When the user forgets to decrease the noise cancellation level, it often makes the user completely unable to hear the external environmental sound, which may cause safety problems. Therefore, it needs to control a noise cancellation filter automatically according to a motion state, so that the user may perceive useful external noise during the motion, thereby avoiding safety problems. Furthermore, when there is wind noise, since the wind noise is a random signal and has no fixed phase characteristics, reverse superposition of feedforward noise cancellation will cause the wind noise to be amplified at some moments, which will affect the user's sense of hearing seriously. Therefore, it needs to control a feedforward filter automatically according to the intensity of the wind noise of different frequency bands, to avoid the adverse influence of the wind noise on the sense of hearing.

FIG. 1 is a schematic flowchart of a signal processing method for an earphone according to an embodiment of the disclosure, as shown in FIG. 1, the signal processing method for an earphone according to the embodiment includes operations 110 to 130:

In operation 110, a motion state of a wearer of the earphone is detected by using an acceleration sensor arranged inside the earphone.

The motion state of the wearer of the earphone may be acquired by a triaxial acceleration sensor arranged inside the earphone. The currently integrated triaxial acceleration sensor usually has an output of the number of steps, or step counting statistics may be performed according to the triaxial acceleration signal, and then it is determined, according to the output of the number of steps, whether there is a motion. According to an embodiment, when there is step counting continuously for 3 seconds (s) and the total number of steps is greater than 8, then it may be determined that the wearer of the earphone is in a motion state at the moment; and when there is no step counting continuously for 3 seconds (s), then it may be determined that the wearer of the earphone is in a non-motion state at the moment.

In operation 120, a first microphone and a second microphone both arranged outside the earphone detect wind noise conditions corresponding to different frequency bands.

The wind noise condition is detected mainly by signal of microphones arranged outside the earphone. In the disclosure, two microphones are both arranged outside the earphone: a first microphone and a second microphone. The positions for arranging the two microphones are slightly different, herein the first microphone is located far away from the mouth of the wearer of the earphone, and is mainly used to collect the environmental noise around the wearer of the earphone, also known as a feedforward microphone; and the second microphone is located close to the mouth of the wearer of the earphone, and is mainly used to collect the voice signal of the wearer of the earphone, also known as a talk microphone.

Furthermore, a feedback microphone is usually arranged inside the earphone too, which is located in a coupling cavity between the human ear and the earphone, and is configured to collect residual noise in the coupling cavity.

Frequency bands of the signals are divided into multiple different frequency bands, and the presence or absence of the wind noise and the intensity of the wind noise are detected for each of the frequency band respectively, to detect the frequency band polluted by the wind noise, so that in the motion state, a suitable frequency band is selected to amplify the external environmental sound and avoid safety problems to the greatest extent.

It should be noted that the above operations 110 and 120 are performed synchronously, and what is acquired is the motion state of the wearer of the earphone and the wind noise conditions corresponding to different frequency bands at the same time.

In operation 130, according to the motion state of the wearer of the earphone and the wind noise conditions corresponding to different frequency bands, operating modes of a feedforward filter and a feedback filter inside the earphone are adjusted, herein the feedforward filter and the feedback filter are configured for active noise cancellation of the earphone.

In this operation, at least the coefficient of the feedforward filter or the coefficient of the feedback filter is adjusted according to the motion state of the wearer of the earphone and the wind noise conditions corresponding to different frequency bands, so that they have appropriate noise cancellation effects at different scenarios and different frequency bands.

The principle of active noise cancellation of the feedforward filter is to control a loudspeaker to generate noise with close energy and an opposite phase, according to the ambient environmental noise collected by the feedforward microphone (the first microphone), thereby achieving the noise cancellation effect. The principle of active noise cancellation of the feedback filter is to control the loudspeaker to generate a signal of which energy is close to and phase is opposite to the noise in the coupling cavity, according to the residual noise in the coupling cavity collected by the feedback microphone, thereby achieving the noise cancellation effect.

It should be noted that when only feedforward noise cancellation is used, it may be considered that the feedback microphone is not arranged, and the algorithm of the embodiment is also applicable.

Compared with the related art, the signal processing method and device for an earphone and the earphone provided by the embodiments consider the motion state of the wearer and wind noise conditions corresponding to different frequency bands together, when performing active noise cancellation control on the filter group inside the earphone, so that the user in motion may perceive the useful outside noise, by adjusting the operating modes of the feedforward filter and the feedback filter inside the earphone, thereby avoiding safety problems; and when there is wind noise, the noise cancellation processing of the feedforward filter is controlled to avoid the frequency band where the wind noise is located, thereby avoiding the adverse influence of the wind noise on the sense of hearing.

The above operation 120 and 130 are described in detail below.

In order to detect the wind noise condition effectively, the embodiment obtains a method for detecting wind noise conditions corresponding to different frequency bands effectively according to the correlation of signals of the feedforward microphone and the talk microphone at different frequency bands, and energy of the signal of the feedforward microphone at different frequency bands. Since the intensity of the wind noise is different, the frequency band that the wind noise may reach is also different, for example, in the case of no wind noise or weak wind noise in the low frequency band, it may be considered that there is no wind noise in the mid frequency band and the high frequency band either, while in the case of strong wind noise in the low frequency band, the mid frequency band may have weak wind noise or strong wind noise. Moreover, the intensity of the wind noise and the frequency band where it is located change in real time. In order to ensure that the user may hear the external environmental sound in the motion state, it needs to consider amplifying signals in the mid and high frequency bands (horns and alarms are usually in the mid and high frequency bands), but when the wind noise is present, the frequency band where the wind noise is present cannot be amplified to avoid affecting the sense of hearing. Therefore, in the motion, in order to avoid amplifying the wind noise and to amplify the external environmental sound in mid and high frequency bands as much as possible, the embodiment divides the determination of the wind noise into three frequency bands: low frequency band, mid frequency band and high frequency band. The presence or absence of the wind noise in the three frequency bands and the intensity of the wind noise are determined respectively, so that in a motion mode, a suitable frequency band may be selected to amplify the external environmental sound, avoid safety problems to the greatest extent while avoid the adverse effect of the wind noise.

In some embodiments, the above operation 120 includes: the average correlation of signals of the two microphones corresponding to each of three frequency bands including a low frequency band, a mid frequency band and a high frequency band respectively, and the average energy of the signals of the first microphone are acquired according to signals collected by the first microphone and the second microphone; and then it is determined, according to the acquired average correlations and average energies, whether there is wind noise in the three frequency bands, and intensities of the wind noise in the three frequency bands.

The division of the above three frequency bands including a low frequency band, a mid frequency band and a high frequency band considers a frequency range where the wind noise is mainly located and an approximate frequency range where some environmental noise is located, such as the frequency range during operation of electric vehicles, cars, bicycles, etc., and the frequency of whistle, etc.

In some embodiments, the "acquiring, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands" includes:

according to time domain signals collected by the first microphone and the second microphone, frequency domain signals of the first microphone and the second microphone at each of frequency points are acquired; and frequency bands of the signals are divided into three frequency bands including a low frequency band, a mid frequency band and a high frequency band, and according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands are acquired.

In some embodiments, the "determining, according to the acquired average correlations and average energies, whether there is wind noise in the three frequency bands, and the intensities of the wind noise in the three frequency bands" includes:

for each frequency band, if the average correlation is less than a first correlation threshold, it is determined that there is strong wind noise in the frequency band responsive to the average energy being greater than a first energy threshold, it is determined that there is weak wind noise in the frequency band responsive to the average energy being less than the first energy threshold but greater than a second energy threshold, and it is determined that there is no wind noise in the frequency band responsive to the average energy being less than the second energy threshold;

for each frequency band, if the average correlation is greater than the first correlation threshold but less than a second correlation threshold, it is determined that there is weak wind noise in the frequency band responsive to the average energy being greater than the second energy threshold, and it is determined that there is no wind noise in the frequency band responsive to the average energy being less than the second energy threshold; and for each frequency band, if the average correlation is greater than the second correlation threshold, it is determined that there is no wind noise in the frequency band.

The above determination logic is applicable to the three frequency bands including the low frequency band, the mid frequency band and the high frequency band.

It should be noted that when whether there is wind noise in the three frequency bands, and the intensities of the wind noise in the three frequency bands are determined, whether there is wind noise in the low frequency band is first determined, and when it is determined that there is wind noise in the low frequency band, whether there is wind noise in the mid frequency band is then determined, and when it is determined that there is wind noise in the mid frequency band, whether there is wind noise in the high frequency band is then determined. This is because: since the intensity of the wind noise is different, the frequency band that the wind noise may reach is also different. The stronger the wind noise, the higher the frequency that may be reached, and the wider the frequency band involved. When the wind noise is weak, it is only present at low frequencies. Therefore, when it is determined that there is no wind noise in the low frequency band, it is also considered that there is no wind noise in the mid frequency band and the high frequency band, thus it does not need to determine whether there is wind noise in the mid frequency band and the high frequency band; when it is determined that there is no wind noise in the mid frequency band, it is also considered that there is no wind noise in the high frequency band, thus it does not need to determine whether there is wind noise in the high frequency band. With the sequence of determining from the low frequency band, the mid frequency band to the high frequency band, when there is no wind noise in the low frequency band or the mid frequency band, the number of determination may be reduced without affecting the accuracy of the result of determination.

Figure 2:
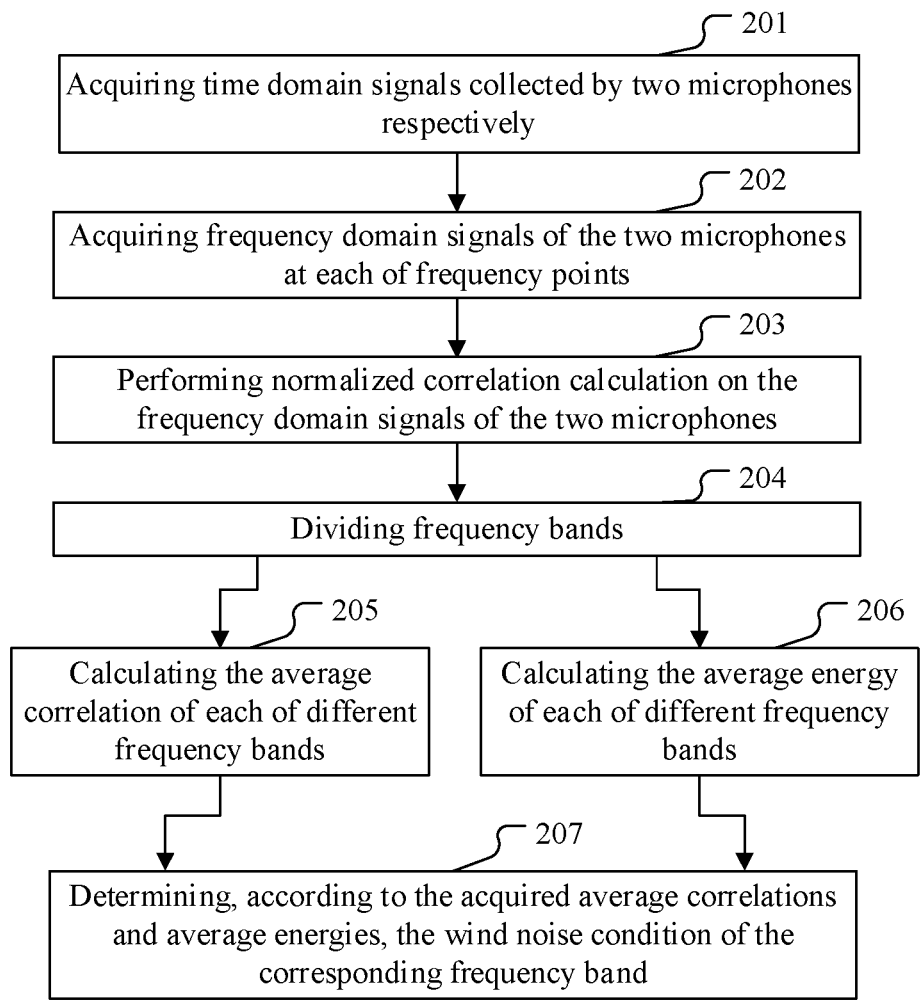
FIG. 2 is a schematic flowchart of a method for detecting wind noise according to an embodiment of the disclosure.

FIG. 2 is a schematic flowchart of a method for detecting wind noise according to an embodiment of the disclosure. With reference to FIG. 2, the method for detecting wind noise given by the embodiment includes operations 201 to 207:

In operation 201, time domain signals collected by two microphones respectively are acquired.

For example, the time domain signal collected by the first microphone (the feedforward microphone) is denoted as x=[x(0), x(1), . . . , x(N−1)], and the time domain signal collected by the second microphone (the talk microphone) is denoted as y=[y(0), y(1), . . . , y(N−1)].

Furthermore, in order to filter out the influence of DC signal, it usually needs to perform high-pass filtering on the time domain signals of the two microphones.

In operation 202, frequency domain signals of the two microphones at each of frequency points are acquired.

This operation is to add analysis windows and perform Fourier transform to the time domain signals of the two microphones after high-pass filtering respectively, to obtain the frequency domain signals.

The added analysis window such as a Hamming window (w=[w(0), w(1), . . . , w(N−1)]). The frequency domain signals of the two microphones at each of frequency points are acquired, denoted as X(k), Y(k) respectively, as shown in the following formula:

$$X(k) = \sum_{n=0}^{N-1} x(n)w(n)e^{-j2\pi/N} \quad 0 \Leftarrow k \Leftarrow N-1; \text{ and}$$

$$Y(k) = \sum_{n=0}^{N-1} y(n)w(n)e^{-j2\pi/N} \quad 0 \Leftarrow k \Leftarrow N-1.$$

Herein, N represents the number of Fourier transform points, n represents the sampling point of signal sequence, and k represents the frequency point.

In operation 203, normalized correlation calculation on the frequency domain signals of the two microphones is performed.

This operation is to perform amplitude normalization processing on the frequency domain signals of the two microphones respectively, as shown in the following formula, to obtain normalized signals $X_{norm}(k)$ and $Y_{norm}(k)$:

$$X_{norm}(k) = \frac{X(k)}{|X(k)|} \quad Y_{norm}(k) = \frac{Y(k)}{|Y(k)|}.$$

Then the normalized signals are used by the following formula to obtain the correlation signal:

$$Coh(k) = \text{abs}\left(\frac{X_{norm}(k)Y_{norm}(k)}{sqrt(X_{norm}(k))sqrt(Y_{norm}(k))}\right).$$

In operation 204, frequency bands are divided.

This operation is to divide frequency bands of the signals into three frequency bands corresponding to low frequency, mid frequency and high frequency. For example, according to actual conditions and empirical data, in order to avoid mutual interference between different frequency bands, the frequency bands of the signals are divided into the following three discontinuous frequency bands: 200 Hz-600 Hz, 700 Hz-1200 Hz, and 1300 Hz-3000 Hz. Of course, the frequency bands of the signals may also be divided into three continuous frequency bands according to actual needs.

The conversion formula between frequency point in frequency domain and frequency in time domain is as follows:

$$bin = \frac{f}{fs}N.$$

Herein, bin represents frequency point in the frequency domain (or referred to as frequency window), f represents actual frequency in the time domain, such as 200 Hz, 600 Hz, 700 Hz, 1200 Hz, 1300 Hz and 3000 Hz, etc., fs=8000 Hz represents the sampling rate, the length of time for processing signals is 0.016 s, N=8000*0.016=256, which represents the number of Fast Fourier Transformation (FFT) points.

In operation 205, the average correlation of each of different frequency bands is calculated.

The following method may be used to calculate the average correlation of signals of the two microphones at different frequency bands:

$$Coh_{band\_i} = \frac{1}{i\_bin_{end} - i\_bin_{start} + 1} \sum_{k=i\_bin_{start}}^{i\_bin_{end}} Coh(k).$$

Herein, $Coh_{band\_i}$ represents the average correlation of the i-th frequency band, $band_i$ represents the i-th frequency band (for example, the first frequency band is the low frequency band, the second frequency band is the mid frequency band, and the third frequency band is the high frequency band), $i\_bin_{start}$ represents the serial number of the frequency point where the i-th frequency band starts, $i\_bin_{end}$ represents the serial number of the frequency point where the i-th frequency band ends, and Coh(k) represents the correlation value at the k-th frequency point.

In operation 206, the average energy of each of different frequency bands is calculated.

The following method may be used to calculate the average energy of the signals of the first microphone in each of different frequency bands:

$$Xpow_{band\_i} = \frac{1}{i\_bin_{end} - i\_bin_{start} + 1} \sum_{k=i\_bin_{start}}^{i\_bin_{end}} (X(k)^\wedge 2).$$

Herein, X(k) represents the amplitude of the frequency domain signal of the first microphone at each of frequency points, and $Xpow_{band\_i}$ represents the average energy of the i-th frequency band.

It should be noted that the above operations 205 and 206 are in a parallel relationship, the two operations may be performed in parallel or sequentially, for example, the frequency domain signal of the first microphone may be divided into different frequency bands, and the average energy of the first microphone at different frequency bands is first calculated, and then the relevant signals of signals of the two microphones are also divided into the same frequency band, and then the average correlation level of signals of the two microphones at a corresponding frequency band is calculated.

In operation 207, according to the acquired average correlations and average energies, the wind noise condition of the corresponding frequency band is determined.

This operation is to determine, according to the acquired average correlation of signals of the two microphones corresponding to each of the three frequency bands including the low frequency band, the mid frequency band and the high frequency band respectively and the average energy of the signals of the first microphone corresponding to each of the three frequency bands, whether there is wind noise at the low frequency, mid frequency and high frequency and the intensity of the wind noise respectively.

According to the randomness of the wind noise, the correlation between the wind noise collected by two microphones is very low, and when the wind noise is large, the energy of the signal of the first microphone is usually large, thus whether there is wind noise at different frequency bands and the intensity of the wind noise may be obtained according to the two characteristics. By considering the energy value of the signal of the microphone when determining the wind noise, incorrect determination that may occur when considering the correlation value of signals of the first and second microphones only may be avoided.

Figure 3:
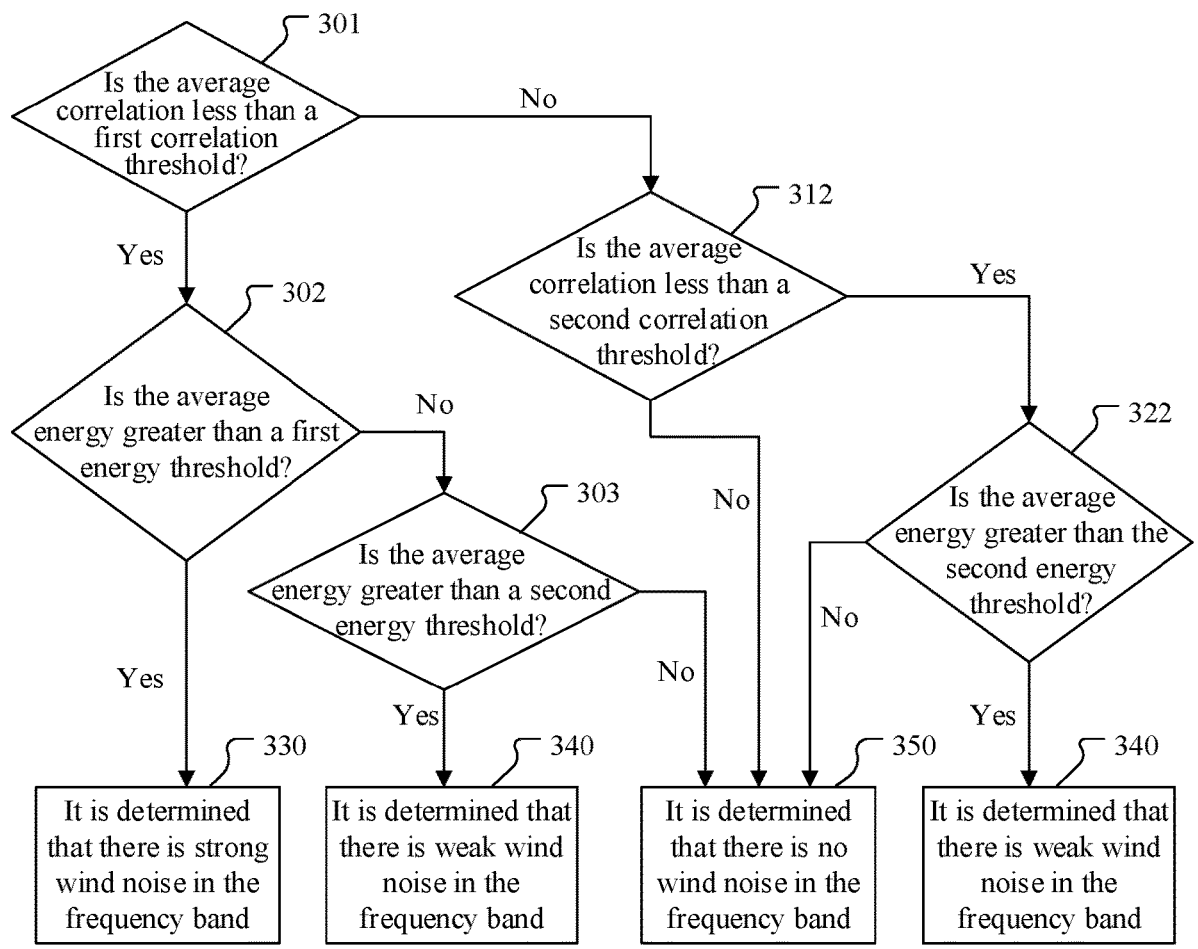
FIG. 3 is a schematic logical diagram of determining wind noise conditions according to an embodiment of the disclosure.

FIG. 3 is a schematic logical diagram of determining wind noise conditions according to an embodiment of the disclosure, the determination logic is applicable to any frequency band of low frequency, mid frequency and high frequency. As shown in FIG. 3, the logic for determining the wind noise condition at a certain frequency band given by the embodiment includes operations 301 to 350:

In operation 301, it is determined whether the average correlation is less than a first correlation threshold; if yes, that is, when the average correlation is less than the first correlation threshold, it goes to operation 302, and if not, that is, when the average correlation is greater than the first correlation threshold, it goes to operation 312.

In operation 302, it is determined whether the average energy is greater than a first energy threshold; if yes, that is, when the average energy is greater than the first energy threshold, it goes to operation 330 in which it is determined that there is strong wind noise. If not, it goes to operation 303.

In operation 303, it is determined whether the average energy is greater than a second energy threshold; if yes, that is, when the average energy is less than the first energy threshold but greater than the second energy threshold, it goes to operation 340 in which it is determined that there is weak wind noise. If not, that is, when the average energy is less than the second energy threshold, it goes to operation 350 in which it is determined that there is no wind noise.

In operation 312, it is determined whether the average correlation is less than a second correlation threshold; if yes, that is, when the average correlation is greater than the first correlation threshold but less than the second correlation threshold, it goes to operation 322, and if not, that is, when the average correlation is greater than the second correlation threshold, it goes to operation 350 in which it is determined that there is no wind noise.

In operation 322, it is determined whether the average energy is greater than the second energy threshold; if yes, that is, when the average energy is greater than the second energy threshold, it goes to operation 340 in which it is determined that there is weak wind noise. If not, that is, when the average energy is less than the second energy threshold, it goes to operation 350 in which it is determined that there is no wind noise.

The correlation thresholds and energy thresholds of different frequency bands may be obtained according to actual test and statistics. For example, it is obtained according to actual test and statistics that corresponding to the low frequency band, the first correlation threshold is 0.35, the second correlation threshold is 0.5, the first energy threshold is 0.0032, and the second energy threshold is 0.0015.

Due to the randomness of the wind noise, when the wind noise is small, or in the case of a quieter environment without wind noise, when the energy of the environmental noise is small, the correlation between two microphones outside the earphone is also relatively low, misjudgment easily occurs by using the correlation only at the moment. In the method for detecting wind noise given by the embodiment, in addition to considering correlation of signals, the energy of the first microphone (the feedforward microphone) is also considered, and when determining the wind noise condition, correlation of signals and energy of signals are considered at the same time to effectively reduce the misjudgment of the wind noise and ensure that the presence of the wind noise is detected only when there is a large wind noise; and the detection result of the wind noise may not only distinguish between weak wind noise and no wind noise, but also avoid determining weak wind noise as strong wind noise.

In some embodiments, the above operation 130 includes:

when the wearer of the earphone is in the motion state and there is weak wind noise in the low frequency band, and no wind noise in the mid frequency band and the high frequency band, coefficient of the feedforward filter is adjusted to allow the feedforward filter to amplify signals in mid and high frequency bands, and the feedback filter is kept unchanged;

when the wearer of the earphone is in the motion state and there is strong wind noise in the low frequency band, there is weak wind noise in the mid frequency band and no wind noise in the high frequency band, the coefficients of the feedforward filter are adjusted to allow the feedforward filter to amplify the signal in the high frequency band only, and the feedback filter is kept unchanged;

when the wearer of the earphone is in the motion state and there is strong wind noise in the mid frequency band, and weak wind noise or strong wind noise in the high frequency band, the feedforward filter is turned off, and the feedback filter is kept unchanged; and when the wearer of the earphone is in the non-motion state and there is strong wind noise in the low frequency band, the feedforward filter is turned off, and the feedback filter is kept unchanged.

In particular, because the physical isolation mainly isolates mid frequency noise and high frequency noise, especially high frequency noise, and the running noise and whistle noise of cars, electric vehicles or bicycles are also mainly located in mid and high frequency bands, for safety reasons, the user needs to hear such noise during motion, thus the feedforward filter needs to amplify the noise in the frequency band so that the user may hear it. In response to the above requirements, the reasons for making the above adjustments to the operating modes of the feedforward filter and the feedback filter in operation 130 are as follows:

When the wearer of the earphone is in the motion state and there is weak wind noise in the low frequency band, and no wind noise in the mid frequency band and the high frequency band, then the coefficients of the feedforward filter are adjusted at the moment, the frequency response curve of the feedforward filter is raised in mid and high frequency bands, so that the noise at the mid and high frequency bands is amplified to let the user hear the external environmental sound, ensuring safety; and the feedback filter is kept unchanged at the moment, that is, the noise cancellation effect of the feedback filter on the low frequency noise is kept.

When the wearer of the earphone is in the motion state and there is strong wind noise in the low frequency band, weak wind noise in the mid frequency band and no wind noise in the high frequency band, then the coefficients of the feedforward filter are adjusted at the moment, the frequency response curve of the feedforward filter is raised at high frequency, so that the noise in the high frequency band is amplified, and it has no effect on the noise at the low and mid frequency bands, which may avoid the adverse influence of the wind noise on the sense of hearing, and may also ensure safety to some extent at the same time. The feedback filter is also kept unchanged at the moment, that is, the noise cancellation effect of the feedback filter on the low frequency noise is kept.

When the wearer of the earphone is in the motion state and there is strong wind noise in the mid frequency band, and weak wind noise or strong wind noise in the high frequency band, then the feedforward filter is turned off directly, and the feedback filter is kept unchanged, that is, only the noise cancellation effect of the feedback filter on the low frequency noise is kept.

When the wearer of the earphone is in the non-motion state, but there is strong wind noise at the current frequency band, that is, he/she is in a wind noise environment, since there are no safety problems at the moment, the feedforward filter may be turned off, and only the noise cancellation effect of the feedback filter on the low frequency noise is kept.

Figure 4:
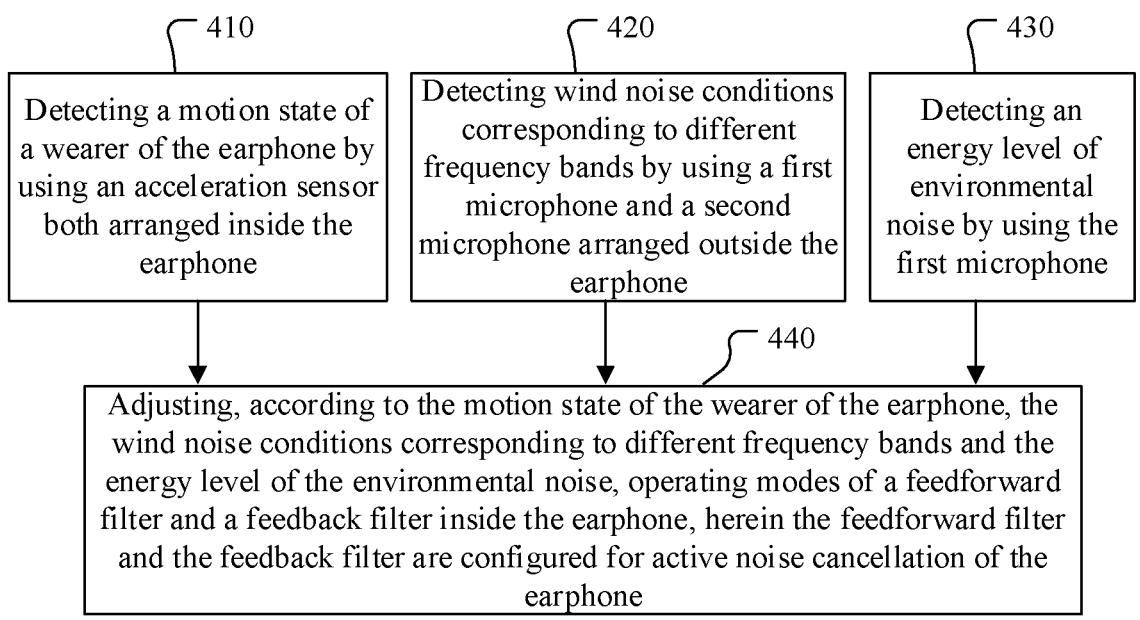
FIG. 4 is a schematic flowchart of a signal processing method for an earphone according to another embodiment of the disclosure.

FIG. 4 a schematic flowchart of a signal processing method for an earphone according to another embodiment of the disclosure, as shown in FIG. 4, the signal processing method for an earphone according to the embodiment includes operations 410 to 440:

In operation 410, a motion state of a wearer of the earphone is detected by using a triaxial acceleration sensor arranged inside the earphone.

In operation 420, a first microphone and a second microphone both arranged outside the earphone detect wind noise conditions corresponding to different frequency bands.

In operation 430, an energy magnitude of environmental noise is detected by using the first microphone.

In operation 440, according to the motion state of the wearer of the earphone, the wind noise conditions corresponding to different frequency bands and the energy magnitude of the environmental noise, operating modes of a feedforward filter and a feedback filter inside the earphone are adjusted, herein the feedforward filter and the feedback filter are configured for active noise cancellation of the earphone.

Compared with the signal processing method for an earphone as shown in FIG. 1, the signal processing method for an earphone as shown in FIG. 4 adds operation 430, operation 430 and operations 410, 420 are performed synchronously, that is, what is acquired is the motion state of the wearer of the earphone, the wind noise conditions corresponding to different frequency bands and the energy magnitude of the environmental noise at the same time; FIG. 4 replaces operation 130 shown in FIG. 1 with operation 440, the energy magnitude of the environmental noise is also considered when adjusting the operating modes of the feedforward filter and the feedback filter inside the earphone; operations 410 and 420 shown in FIG. 4 are the same as operations 110 and 120 shown in FIG. 1 respectively.

In some embodiment, the above operation 430 includes: exponential smoothing is performed on the frequency domain signal of the first microphone at any of frequency points, and a minimum value of the smoothed signals is taken within a set length of time to obtain the environmental noise signal of the frequency point in the current time frame; and the environmental noise signals of all the frequency points in the current time frame are superimposed to obtain a total energy of the environmental noises.

In particular, traditional methods for estimating noise such as the method for estimating noise with minimum statistics may be used to calculate the energy magnitude of the environmental noise, perform exponential smoothing on the frequency domain signal X(k) of the first microphone at each frequency point k, then take a minimum value of the smoothed signals within a set length of time to obtain the environmental noise signal Noise(k) shown in the following formula, herein λ is the current time frame, W is the time length, k is the frequency point, and P(λ,k) is the smoothed signal spectrum:

$$P(\lambda,k)=\alpha P(\lambda-1,k)+(1-\alpha)|X(k)|^2$$

$$\text{Noise}(k)=\min[P(\lambda-W+1,k),P(\lambda-W+2,k),\ldots P(\lambda,k)].$$

Then for the estimated environmental noise signal Noise (k), the following formula is used to calculate the total energy NoisePow.

$$NoisePow = \sum_{k=1}^{N} \text{Noise }(k).$$

The method for estimating the energy magnitude of the environmental noise given by the embodiment may avoid the interference of transient signals. In addition, when there is wind noise, the noise estimation is not updated, which may avoid the influence of the wind noise on the calculation of energy of the environmental noise.

When adjusting the operating modes of the feedforward filter and the feedback filter inside the earphone, the above operation 440 needs to consider the energy magnitude of the environmental noise to include the following two situations:

First situation: when the wearer of the earphone is in the motion state and there is no wind noise in the low frequency band, then the coefficients of the feedforward filter are adjusted to allow the feedforward filter to amplify signals in mid and high frequency bands, and a feedforward filter and a feedback filter with appropriate noise cancellation levels are selected according to the energy magnitude of the environmental noise in the low frequency band, so that there is an appropriate level of noise cancellation in the low frequency band;

Second situation: when the wearer of the earphone is in the non-motion state, and there is no wind noise or weak wind noise in the low frequency band, a feedforward filter and a feedback filter with appropriate noise cancellation levels are selected according to the energy magnitude of the environmental noise in the entire frequency bands, to perform noise cancellation on the entire frequency bands.

In particular, when the wearer of the earphone is in the motion state, for noise control in the low frequency band, the environmental noise may be pre-divided into different levels according to the energy magnitude of the environmental noise in the low frequency band, and the corresponding preset coefficients of the feedforward filter and the feedback filter may be selected according to different noise levels, so that there is an appropriate level of noise cancellation in the low frequency band. When the wearer of the earphone is in the non-motion state, for noise control in the entire frequency bands, the environmental noise may be pre-divided into different levels according to the energy magnitude of the environmental noise in the entire frequency bands, and the corresponding preset coefficients of the feedforward filter and the feedback filter may be selected according to different noise levels, to perform noise cancellation on the entire frequency bands. Further description will be made hereinafter.

The feedforward filter processes the signal of the feedforward microphone, and the feedback filter processes the signal of the feedback microphone, both of them may be implemented by software on a chip. The applicant found that the feedforward filter has a good noise cancellation effect mainly on about 500 Hz-1000 Hz, but has a limited noise cancellation effect on the low frequency band below 500 Hz, but the feedback filter has a noise cancellation effect mainly on the low frequency band below 500 Hz. Therefore, considering that the feedforward filter and the feedback filter have different noise cancellation effects on different frequency bands, the operating modes of the feedforward filter and the feedback filter may be adjusted according to the energy magnitude of the environmental noise to ensure the level of noise cancellation at the corresponding frequency band. For example, when the wearer of the earphone is in the motion state and there is no wind noise in the low frequency band at the moment, safety is considered, and the energy of the environmental noise is usually strong at low frequency, thus it needs to amplify the environmental noises in the mid and high frequency bands and perform a proper noise cancellation on the low frequency. For the selection of the noise cancellation filter, the noise cancellation level of the noise cancellation filter may be divided into different levels according to the low frequency energy magnitude of the environmental noise (each level has its corresponding preset coefficients of the feedforward filter and the feedback filter), when the low frequency energy of the environmental noise is high, then a noise cancellation filter with a high noise cancellation level is selected, otherwise, a noise cancellation filter with a low noise cancellation level is selected. When there is wind noise in the low frequency band, the filter is not adjusted according to the low frequency energy of the environmental noise any more. When the user is in the non-motion state, and there is no wind noise or there is little wind noise in the low frequency band at the moment, the noise cancellation may be divided into different levels according to the energy of the environmental noise in the entire frequency bands, and each level has its corresponding preset coefficients of the feedforward filter and the feedback filter. When the energy of the environmental noise is high, then a high level noise cancellation filter is selected, otherwise, a low level noise cancellation filter is selected. When there is strong wind noise in the low frequency band, the filter is not adjusted according to the energy of the environmental noise.

By considering the four control situations included in operation 130 of FIG. 1, operation 440 of FIG. 4 "adjusting, according to the motion state of the wearer of the earphone, the wind noise conditions corresponding to different frequency bands and the energy magnitude of the environmental noise, operating modes of the feedforward filter and the feedback filter inside the earphone" includes at least six control situations.

Figure 5:
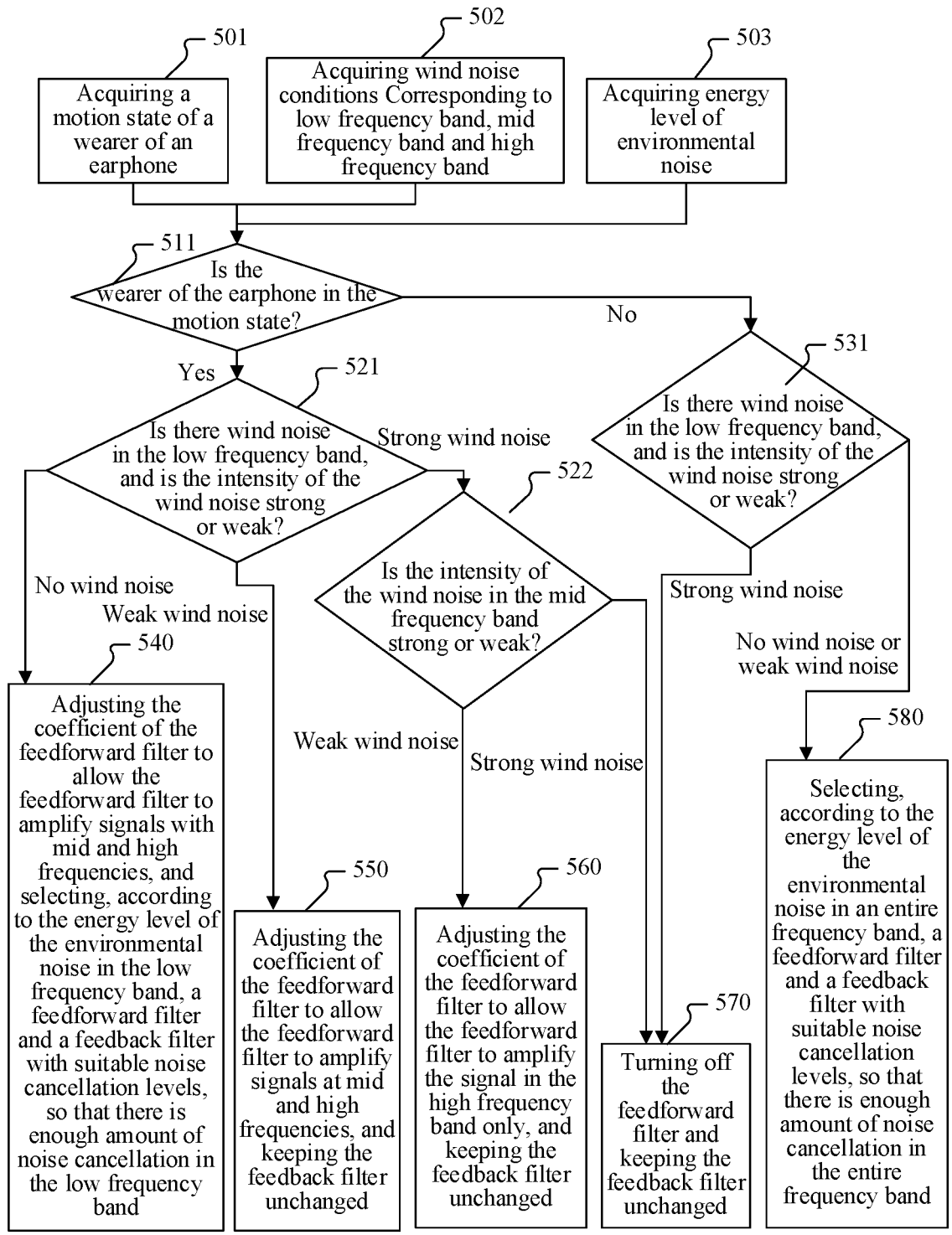
FIG. 5 is a schematic logical diagram of controlling active noise cancellation according to an embodiment of the disclosure.

FIG. 5 is a schematic logical diagram of controlling active noise cancellation according to an embodiment of the disclosure. As shown in FIG. 5, the logic of controlling active noise cancellation given by the embodiment includes operations 501 to 580:

In operation 501, a motion state of a wearer of an earphone is acquired.

In operation 502, wind noise conditions corresponding to low frequency band, mid frequency band and high frequency band are acquired.

In operation 503, energy magnitude of environmental noise is acquired.

In operation 511, it is determined whether the wearer of the earphone is in the motion state; if yes, that is, the wearer of the earphone is in the motion state, it goes to operation 521, and if not, that is, the wearer of the earphone is in a non-motion state, it goes to operation 531.

In operation 521, it is determined whether there is wind noise in the low frequency band, and the intensity of the wind noise; when it is determined that there is no wind noise in the low frequency band, it goes to operation 540, and when it is determined that there is weak wind noise in the low frequency band, it goes to operation 550, and when it is determined that there is strong wind noise in the low frequency band, it goes to operation 522.

In operation 522, the intensity of the wind noise in the mid frequency band is determined, when it is determined that there is weak wind noise in the mid frequency band, it goes to operation 560, and when it is determined that there is strong wind noise in the mid frequency band, it goes to operation 570.

In operation 531, it is determined whether there is wind noise in the low frequency band, and the intensity of the wind noise; when it is determined that there is no wind noise or weak wind noise in the low frequency band, it goes to operation 580, and when it is determined that there is strong wind noise in the low frequency band, it goes to operation 570.

In operation 540, the coefficients of the feedforward filter are adjusted to allow the feedforward filter to amplify signals in mid and high frequency bands, and according to the energy magnitude of the environmental noise in the low frequency band, a feedforward filter and a feedback filter with appropriate noise cancellation levels are selected, so that there is enough level of noise cancellation in the low frequency band. For example, when the environmental noise is large in the low frequency band, a higher noise cancellation level may be selected.

Note: in the case of no wind noise in the low frequency band, it may be considered that there is no wind noise in the mid frequency band and the high frequency band, either.

In operation 550, the coefficients of the feedforward filter are adjusted to allow the feedforward filter to amplify signals in mid and high frequency bands, and the feedback filter is kept unchanged.

Note: in the case of weak wind noise in the low frequency band, it may be considered that there is no wind noise in the mid frequency band and the high frequency band.

In operation 560, the coefficients of the feedforward filter are adjusted to allow the feedforward filter to amplify the signal in the high frequency band only, and the feedback filter is kept unchanged.

Note: in the case of strong wind noise in the low frequency band, there may be weak wind noise or strong wind noise in the mid frequency band. In the case of weak wind noise in the mid frequency band, it may be considered that there is no wind noise in the high frequency band.

In operation 570, the feedforward filter is turned off and the feedback filter is kept unchanged.

Note: in the case of strong wind noise in the mid frequency band, there may be weak wind noise or strong wind noise in the high frequency band.

In operation 580, according to the energy magnitude of the environmental noise in the entire frequency bands, a feedforward filter and a feedback filter with appropriate noise cancellation levels are selected to perform noise cancellation on the entire frequency bands, so that there is enough level of noise cancellation in the entire frequency bands. For example, the noise cancellation level is divided into different levels according to the energy magnitude of the environmental noise, and each level has its corresponding preset coefficients of the feedforward filter and the feedback filter. When the energy of the environmental noise is high, then a noise cancellation filter with high noise cancellation level is selected, otherwise, a noise cancellation filter with low noise cancellation level is selected.

It should be noted that there are two control situations for the control method corresponding to the above operation 570 "turning off the feedforward filter and keeping the feedback filter unchanged": one is in the non-motion state, as long as there is strong wind noise in the low frequency band, the feedforward filter is turned off directly, and this operation is performed no matter whether there is wind noise in the mid frequency band or the high frequency band, thus it does not need to consider the wind noise conditions of the mid and high frequency bands. The other is in the motion state, for safety reasons, it needs to amplify the environmental noise, but the frequency bands affected by the level of the wind noise are different, it needs to determine, according to the frequency bands to which the wind noise relates, the frequency bands that may be amplified, thus it needs to consider the wind noise conditions of the mid and high frequency bands. However, as long as there is strong wind noise in the mid frequency band, the feedforward filter is also turned off directly to avoid the adverse influence of the wind noise on the sense of hearing.

So far, the implementation of the signal processing method for an earphone according to the embodiment has been described in detail. The signal processing method for an earphone according to the embodiment adjusts the operating modes of the feedforward filter and the feedback filter inside the earphone by considering the motion state of the wearer of the earphone, the wind noise conditions corresponding to different frequency bands and the energy magnitude of the environmental noise together, to achieve controlling the noise cancellation effect automatically, while obtaining a better effect on the sense of hearing at different scenarios, and reducing safety problems caused by noise cancellation during motion.

Figure 6:
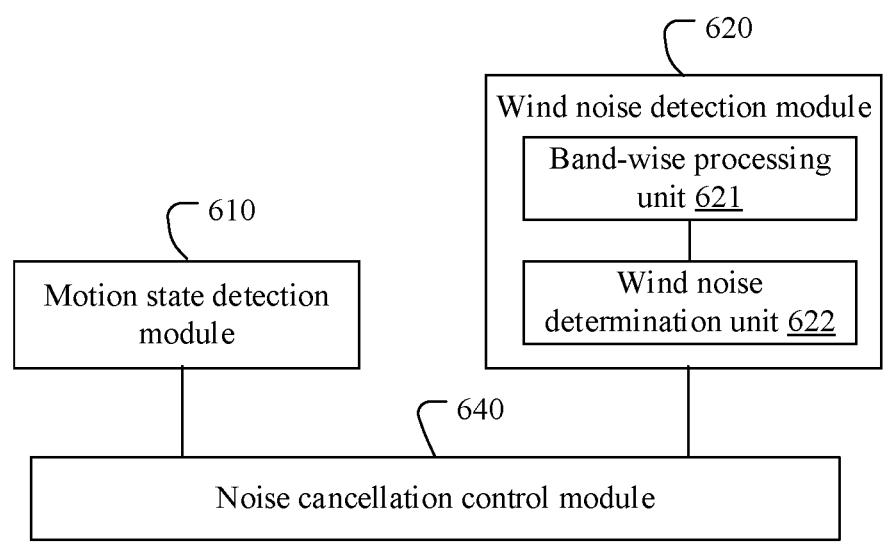
FIG. 6 is a schematic structural diagram of a signal processing device for an earphone according to an embodiment of the disclosure.

FIG. 6 is a schematic structural diagram of a signal processing device for an earphone according to an embodiment of the disclosure, as shown in FIG. 6, the signal processing device for an earphone according to the embodiment includes:

a motion state detection module 610 is configured to detect a motion state of a wearer of the earphone by using an acceleration sensor arranged inside the earphone; for example, an output of the number of steps is acquired by a triaxial acceleration sensor integrated inside the earphone, or step counting statistics may be performed according to the triaxial acceleration signal, and then it is determined, according to the output of the number of steps, whether there is a motion.

a wind noise detection module 620 is configured to detect wind noise conditions corresponding to different frequency bands by using a first microphone and a second microphone both arranged outside the earphone; and a noise cancellation control module 640 is configured to adjust, according to the motion state of the wearer of the earphone and the wind noise conditions corresponding to different frequency bands, operating modes of a feedforward filter and a feedback filter inside the earphone, herein the feedforward filter and the feedback filter are configured for active noise cancellation of the earphone.

Herein the motion state detection module 610 and the wind noise detection module 620 are connected in parallel to the noise cancellation control module 640.

In some embodiments, also as shown in FIG. 6, the wind noise detection module 620 includes:

a band-wise processing unit 621 is configured to acquire, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands; and a wind noise determination unit 622 is configured to determine, according to the acquired average correlations and average energies, whether there is wind noise in the three frequency bands, and the intensities of the wind noise in the three frequency bands.

In some embodiments, the band-wise processing unit 621 is specifically configured to:

acquire, according to time domain signals collected by the first microphone and the second microphone, frequency domain signals of the first microphone and the second microphone at each of frequency points; and divide frequency bands of the signals into three frequency bands including a low frequency band, a mid frequency band and a high frequency band, and acquire, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

In some embodiments, the wind noise determination unit 622 is specifically configured to:

for each frequency band, if the average correlation is less than a first correlation threshold, determine that there is strong wind noise in the frequency band responsive to the average energy being greater than a first energy threshold, determine that there is weak wind noise in the frequency band responsive to the average energy being less than the first energy threshold but greater than a second energy threshold, and determine that there is no wind noise in the frequency band responsive to the average energy being less than the second energy threshold;

for each frequency band, if the average correlation is greater than the first correlation threshold but less than a second correlation threshold, determine that there is weak wind noise in the frequency band responsive to the average energy being greater than the second energy threshold, and determine that there is no wind noise in the frequency band responsive to the average energy being less than the second energy threshold; and for each frequency band, if the average correlation is greater than the second correlation threshold, determine that there is no wind noise in the frequency band.

In some embodiments, the noise cancellation control module 640 is specifically configured to:

when the wearer of the earphone is in the motion state and there is weak wind noise in the low frequency band, and no wind noise in the mid frequency band and the high frequency band, adjust coefficients of the feedforward filter to allow the feedforward filter to amplify signals in mid and high frequency bands, and keep the feedback filter unchanged;

when the wearer of the earphone is in the motion state and there is strong wind noise in the low frequency band, weak wind noise in the mid frequency band and no wind noise in the high frequency band, adjust the coefficients of the feedforward filter to allow the feedforward filter to amplify the signal in the high frequency band only, and keep the feedback filter unchanged;

when the wearer of the earphone is in the motion state and there is strong wind noise in the mid frequency band, and weak wind noise or strong wind noise in the high frequency band, turn off the feedforward filter, and keep the feedback filter unchanged;

when the wearer of the earphone is in a non-motion state and there is strong wind noise in the low frequency band, turn off the feedforward filter, and keep the feedback filter unchanged.

Figure 7:
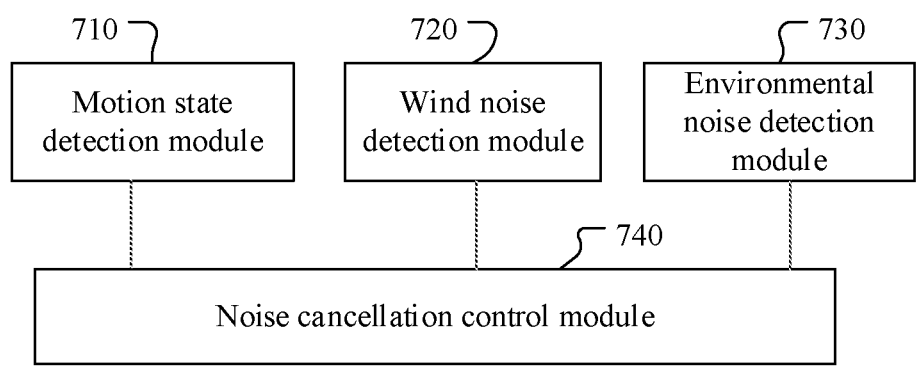
FIG. 7 is a schematic structural diagram of a signal processing device for an earphone according to another embodiment of the disclosure.

FIG. 7 is a schematic structural diagram of a signal processing device for an earphone according to another embodiment of the disclosure, as shown in FIG. 7, the signal processing device for an earphone according to the embodiment includes:

a motion state detection module 710 is configured to detect, by a triaxial acceleration sensor arranged inside the earphone, a motion state of a wearer of the earphone;

a wind noise detection module 720 is configured to detect wind noise conditions corresponding to different frequency bands by using a first microphone and a second microphone both arranged outside the earphone;

an environmental noise detection module 730 is configured to detect an energy magnitude of environmental noise by using the first microphone; and a noise cancellation control module 740 is configured to adjust, according to the motion state of the wearer of the earphone, the wind noise conditions corresponding to different frequency bands and the energy magnitude of the environmental noise, operating modes of a feedforward filter and a feedback filter inside the earphone, herein the feedforward filter and the feedback filter are configured for active noise cancellation of the earphone.

Compared with the signal processing device for an earphone shown in FIG. 6, the signal processing device for an earphone shown in FIG. 7 further includes the environmental noise detection module 730, the environmental noise detection module 730 and the motion state detection module 710, the wind noise detection module 720 are connected in parallel to the noise cancellation control module 740 together; compared with the noise cancellation control module 640 shown in FIG. 6, the noise cancellation control module 740 shown in FIG. 7 also considers the energy magnitude of the environmental noise when adjusting the operating modes of the feedforward filter and the feedback filter inside the earphone; the motion state detection module 710 and the wind noise detection module 720 shown in FIG. 7 are the same as the motion state detection module 610 and the wind noise detection module 620 shown in FIG. 6 respectively.

In some embodiments, the environmental noise detection module 730 is specifically configured to:

perform exponential smoothing on the frequency domain signal of the first microphone at any of frequency points, and take a minimum value of the smoothed signals within a set length of time to obtain the environmental noise signal of the frequency point in the current time frame; and superimpose the environmental noise signals of all the frequency points in the current time frame to obtain a total energy of the environmental noises.

In some embodiments, compared with the noise cancellation control module 640 shown in FIG. 6, the noise cancellation control module 740 is also specifically configured to:

when the wearer of the earphone is in the motion state and there is no wind noise in the low frequency band, adjust the coefficients of the feedforward filter to allow the feedforward filter to amplify signals in mid and high frequency bands, and select, according to the energy magnitude of the environmental noise in the low frequency band, a feedforward filter and a feedback filter with appropriate noise cancellation levels, so that there is an appropriate level of noise cancellation in the low frequency band; and when the wearer of the earphone is in a non-motion state, and there is no wind noise or weak wind noise in the low frequency band, select a feedforward filter and a feedback filter with appropriate noise cancellation levels according to the energy magnitude of the environmental noise in the entire frequency bands, to perform noise cancellation on the entire frequency bands.

For the device embodiment, since it substantially corresponds to the method embodiment, the relevant descriptions thereof may refer to descriptions of the part of the method embodiment. The device embodiment as described above is merely illustrative, herein modules or units described as separate components may be or may not be physically separated, that is, they may be located at one place, or they may be distributed to multiple modules or units. Some or all of the modules may be selected according to actual needs to achieve the objective of the solution of the embodiment. Those ordinarily skilled in the art may understand and implement them without paying any creative work Finally, the disclosure also provides an embodiment of earphone. The earphone provided by the embodiment of the disclosure includes an acceleration sensor arranged inside the earphone, a first microphone and a second microphone both arranged outside the earphone, and a feedforward filter and a feedback filter inside the earphone; the earphone is further provided therein with the above signal processing device for an earphone.

The earphone may be a wireless earphone or a wired earphone. When it is a wireless earphone, the earphone on each side needs to have the acceleration sensor arranged inside the earphone and two microphones both arranged outside the earphone; when it is a wired earphone, the earphones on two sides just need to be provided with a set of acceleration sensors arranged inside the earphone and two microphones both arranged outside the earphone, they may be located on the same side of the wired earphone, or they may be distributed on different sides of the wired earphone. The acceleration sensor inside the earphone may be an integrated triaxial acceleration sensor.

Furthermore, the disclosure also provides an embodiment of a method for detecting wind noise, which detects wind noise conditions corresponding to different frequency bands according to the signal related characteristics of the talk microphone and the feedforward microphone and energy of the signal of the feedforward microphone, reduces the misjudgment of the wind noise effectively and increases the accuracy of detecting the wind noise.

Figure 8:
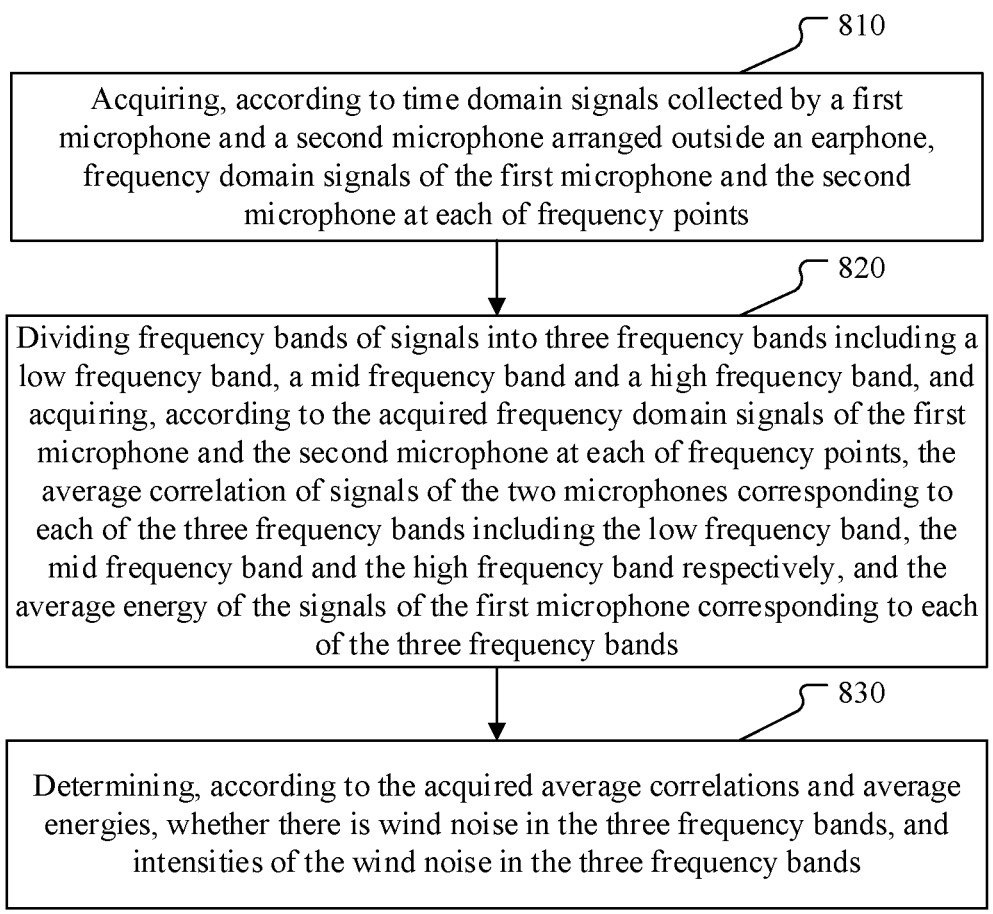
FIG. 8 is a schematic flowchart of a method for detecting wind noise according to an embodiment of the disclosure.

FIG. 8 is a schematic flowchart of a method for detecting wind noise according to an embodiment of the disclosure, as shown in FIG. 8, the method for detecting wind noise according to the embodiment includes operations 810 to 830:

In operation 810, according to time domain signals collected by a first microphone and a second microphone arranged outside an earphone, frequency domain signals of the first microphone and the second microphone at each of frequency points are acquired;

In operation 820, frequency bands of the signals are divided into three frequency bands including a low frequency band, a mid frequency band and a high frequency band, and according to the acquired frequency domain signals of the first microphone and the second microphone at each of frequency points, an average correlation of signals of the two microphones corresponding to each of the three frequency bands including the low frequency band, the mid frequency band and the high frequency band respectively, and average energy of the signals of the first microphone corresponding to each of the three frequency bands are acquired; and In operation 830, it is determined, according to the acquired average correlations and average energies, whether there is wind noise in the three frequency bands, and the intensities of the wind noise in the three frequency bands.

Herein the implementation of operation 810 may refer to the above descriptions of operations 201 to 203 in FIG. 2, and the implementation of operation 820 may refer to the above descriptions of operations 204 to 206 in FIG. 2, which will not be repeated here.

According to an embodiment, the first microphone is a feedforward microphone and the second microphone is a talk microphone.

Herein the "determining, according to the acquired average correlations and average energies, whether there is wind noise in the three frequency bands, and the intensities of the wind noise in the three frequency bands" of operation 830 includes:

for each frequency band, if the average correlation is less than a first correlation threshold, it is determined that there is strong wind noise in the frequency band responsive to the average energy being greater than a first energy threshold, it is determined that there is weak wind noise in the frequency band responsive to the average energy being less than the first energy threshold but greater than a second energy threshold, and it is determined that there is no wind noise in the frequency band responsive to the average energy being less than the second energy threshold;

for each frequency band, if the average correlation is greater than the first correlation threshold but less than a second correlation threshold, it is determined that there is weak wind noise in the frequency band responsive to the average energy being greater than the second energy threshold, and it is determined that there is no wind noise in the frequency band responsive to the average energy being less than the second energy threshold; and for each frequency band, if the average correlation is greater than the second correlation threshold, it is determined that there is no wind noise in the frequency band.

The above determination logic of operation 830 may refer to the schematic logical diagram of determining wind noise conditions shown in FIG. 3, which will not be repeated here either.

Figure 9:
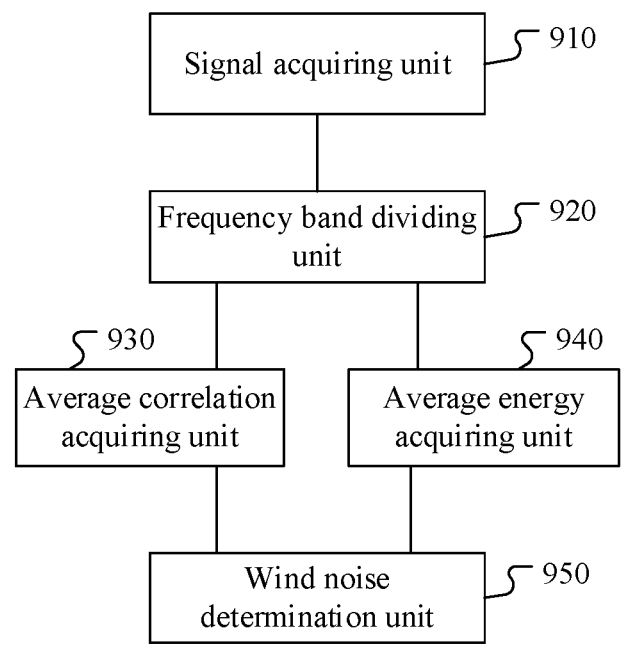
FIG. 9 is a schematic structural diagram of a device for detecting wind noise according to an embodiment of the disclosure.

FIG. 9 is a schematic structural diagram of a device for detecting wind noise according to an embodiment of the disclosure, as shown in FIG. 9, the device for detecting wind noise according to the embodiment includes:

a signal acquiring unit 910 is configured to acquire, according to time domain signals collected by a first microphone and a second microphone arranged outside an earphone, frequency domain signals of the first microphone and the second microphone at each of frequency points;

a frequency band dividing unit 920 is configured to divide frequency bands of the signals into three frequency bands including a low frequency band, a mid frequency band and a high frequency band;

an average correlation acquiring unit 930 is configured to acquire, according to the acquired frequency domain signals of the first microphone and the second microphone at each of frequency points, an average correlation of signals of the two microphones corresponding to each of the three frequency bands including the low frequency band, the mid frequency band and the high frequency band respectively;

an average energy acquiring unit 940 is configured to acquire, according to the acquired frequency domain signals of the first microphone and the second microphone at each of frequency points, an average energy of the signals of the first microphone corresponding to each of the three frequency bands including the low frequency band, the mid frequency band and the high frequency band respectively; and a wind noise determination unit 950 is configured to determine, according to the acquired average correlations and average energies, whether there is wind noise in the three frequency bands, and the intensities of the wind noise in the three frequency bands.

Herein the average correlation acquiring unit 930 and the average energy acquiring unit 940 are in a parallel relationship, and are connected in parallel to the wind noise determination unit 950, and the wind noise determination unit 950 needs to perform a logical determination of the wind noise condition according to the output results of the two units simultaneously.

According to an embodiment, the first microphone is a feedforward microphone and the second microphone is a talk microphone.

Herein the wind noise determination unit 950 is specifically configured to:

for each frequency band, if the average correlation is less than a first correlation threshold, determine that there is strong wind noise in the frequency band responsive to the average energy being greater than a first energy threshold, determine that there is weak wind noise in the frequency band responsive to the average energy being less than the first energy threshold but greater than a second energy threshold, and determine that there is no wind noise in the frequency band responsive to the average energy being less than the second energy threshold;

for each frequency band, if the average correlation is greater than the first correlation threshold but less than a second correlation threshold, determine that there is weak wind noise in the frequency band responsive to the average energy being greater than the second energy threshold, and determine that there is no wind noise in the frequency band responsive to the average energy being less than the second energy threshold; and for each frequency band, if the average correlation is greater than the second correlation threshold, determine that there is no wind noise in the frequency band.

Each of the units of the device for detecting wind noise shown in FIG. 9 substantially corresponds to each of the operations of the method embodiment for detecting wind noise shown in FIG. 2, thus the relevant descriptions thereof may refer to descriptions of the part of the method embodiment of FIG. 2. Furthermore, the determination logic of the wind noise determination unit 950 may refer to the schematic logical diagram of determining wind noise conditions shown in FIG. 3. The method and device for detecting wind noise provided by the embodiments of the disclosure consider both the correlation of signals of the two microphones and energy of signals of the microphones when band-wise determining wind noise, band-wise detect wind noise conditions according to the correlation of signals of the feedforward microphone and the talk microphone at different frequency bands as well as energy of the signal of the feedforward microphone at a corresponding frequency band, which reduces the misjudgment of the wind noise effectively and increases the accuracy of detecting the wind noise.

The above descriptions are only specific implementations of the disclosure, and under the above teachings of the disclosure, those skilled in the art may make other improvements or modifications based on the above embodiments. Those skilled in the art should understand that the above specific descriptions are only for better explaining the objective of the disclosure, and the protection scope of the disclosure should be subject to the protection scope of the claims.

A1. A signal processing method for an earphone, including:

detecting a motion state of a wearer of the earphone by using an acceleration sensor arranged inside the earphone;

detecting wind noise conditions corresponding to different frequency bands by using a first microphone and a second microphone both arranged outside the earphone; and adjusting, according to the motion state of the wearer of the earphone and the wind noise conditions corresponding to different frequency bands, operating modes of a feedforward filter and a feedback filter inside the earphone, herein the feedforward filter and the feedback filter are configured for active noise cancellation of the earphone.

A2. The signal processing method for an earphone of claim A1, herein detecting the wind noise conditions corresponding to different frequency bands includes:

acquiring, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands, herein the first microphone is a feedforward microphone and the second microphone is a talk microphone; and determining, according to the acquired average correlations and average energies, whether there is wind noise in the three frequency bands, and intensities of the wind noise in the three frequency bands.

A3. The signal processing method for an earphone of claim A2, herein the acquiring step includes:

acquiring, according to time domain signals collected by the first microphone and the second microphone, frequency domain signals of the first microphone and the second microphone at each of frequency points; and dividing frequency bands of the signals into three frequency bands including a low frequency band, a mid frequency band and a high frequency band, and acquiring, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

A4. The signal processing method for an earphone of claim A2, herein the determining step includes:

for each frequency band, if the average correlation is less than a first correlation threshold, determining that there is strong wind noise in the frequency band responsive to the average energy being greater than a first energy threshold, determining that there is weak wind noise in the frequency band responsive to the average energy being less than the first energy threshold but greater than a second energy threshold, and determining that there is no wind noise in the frequency band responsive to the average energy being less than the second energy threshold;

for each frequency band, if the average correlation is greater than the first correlation threshold but less than a second correlation threshold, determining that there is weak wind noise in the frequency band responsive to the average energy being greater than the second energy threshold, and determining that there is no wind noise in the frequency band responsive to the average energy being less than the second energy threshold; and for each frequency band, if the average correlation is greater than the second correlation threshold, determining that there is no wind noise in the frequency band.

A5. The signal processing method for an earphone of claim A1, herein the adjusting step includes:

when the wearer of the earphone is in the motion state and there is weak wind noise in the low frequency band, and no wind noise in the mid frequency band and the high frequency band, adjusting coefficients of the feedforward filter to allow the feedforward filter to amplify signals in mid and high frequency bands, and keeping the feedback filter unchanged; or when the wearer of the earphone is in the motion state and there is strong wind noise in the low frequency band, weak wind noise in the mid frequency band and no wind noise in the high frequency band, adjusting the coefficients of the feedforward filter to allow the feedforward filter to amplify the signal in the high frequency band only, and keeping the feedback filter unchanged; or when the wearer of the earphone is in the motion state and there is strong wind noise in the mid frequency band, and weak wind noise or strong wind noise in the high frequency band, turning off the feedforward filter, and keeping the feedback filter unchanged; or when the wearer of the earphone is in a non-motion state and there is strong wind noise in the low frequency band, turning off the feedforward filter, and keeping the feedback filter unchanged.

A6. The signal processing method for an earphone of any one of claims A1 to A5, further including: detecting an energy magnitude of environmental noise by using the first microphone, and considering the energy magnitude of the environmental noise when adjusting the operating modes of the feedforward filter and the feedback filter inside the earphone.

A7. The signal processing method for an earphone of claim A6, herein detecting the energy magnitude of the environmental noise by using the first microphone includes:

performing exponential smoothing on the frequency domain signal of the first microphone at any of frequency points, and taking a minimum value of the smoothed signals within a set length of time to obtain the environmental noise signal of the frequency point in a current time frame; and superimposing the environmental noise signals of all the frequency points in the current time frame to obtain a total energy of the environmental noises.

A8. The signal processing method for an earphone of claim A6, herein the considering the energy magnitude of the environmental noise when adjusting the operating modes of the feedforward filter and the feedback filter inside the earphone includes:

when the wearer of the earphone is in the motion state and there is no wind noise in the low frequency band, adjusting coefficients of the feedforward filter to allow the feedforward filter to amplify signals in mid and high frequency bands, and selecting, according to the energy magnitude of the environmental noise in the low frequency band, a feedforward filter and a feedback filter with appropriate noise cancellation levels so that there is an appropriate level of noise cancellation in the low frequency band; or when the wearer of the earphone is in the non-motion state, and there is no wind noise or weak wind noise in the low frequency band, selecting a feedforward filter and a feedback filter with appropriate noise cancellation levels according to the energy magnitude of the environmental noise in the entire frequency bands, to perform noise cancellation on the entire frequency bands.

B9. A signal processing device for an earphone, including:

a motion state detection module configured to detect a motion state of a wearer of the earphone by using an acceleration sensor arranged inside the earphone;

a wind noise detection module configured to detect wind noise conditions corresponding to different frequency bands by using a first microphone and a second microphone both arranged outside the earphone; and a noise cancellation control module configured to adjust, according to the motion state of the wearer of the earphone and the wind noise conditions corresponding to different frequency bands, operating modes of a feedforward filter and a feedback filter inside the earphone, herein the feedforward filter and the feedback filter are configured for active noise cancellation of the earphone.

B10. The signal processing device for an earphone of claim B9, herein the wind noise detection module includes:

a band-wise processing unit configured to acquire, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands, herein the first microphone is a feedforward microphone and the second microphone is a talk microphone; and a wind noise determination unit configured to determine, according to the acquired average correlations and average energies, whether there is wind noise in the three frequency bands, and intensities of the wind noise in the three frequency bands.

B11. The signal processing device for an earphone of claim B10, herein the band-wise processing unit is specifically configured to:

acquire, according to time domain signals collected by the first microphone and the second microphone, frequency domain signals of the first microphone and the second microphone at each of frequency points; and divide frequency bands of the signals into three frequency bands including a low frequency band, a mid frequency band and a high frequency band, and acquire, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

B12. The signal processing device for an earphone of claim B10, herein the wind noise determination unit is specifically configured to:

for each frequency band, if the average correlation is less than a first correlation threshold, determine that there is strong wind noise in the frequency band responsive to the average energy being greater than a first energy threshold, determine that there is weak wind noise in the frequency band responsive to the average energy being less than the first energy threshold but greater than a second energy threshold, and determine that there is no wind noise in the frequency band responsive to the average energy being less than the second energy threshold;

for each frequency band, if the average correlation is greater than the first correlation threshold but less than a second correlation threshold, determine that there is weak wind noise in the frequency band responsive to the average energy being greater than the second energy threshold, and determine that there is no wind noise in the frequency band responsive to the average energy being less than the second energy threshold; and for each frequency band, if the average correlation is greater than the second correlation threshold, determine that there is no wind noise in the frequency band.

B13. The signal processing device for an earphone of claim B9, herein the noise cancellation control module is specifically configured to:

when the wearer of the earphone is in the motion state and there is weak wind noise in the low frequency band, and no wind noise in the mid frequency band and the high frequency band, adjust coefficients of the feedforward filter to allow the feedforward filter to amplify signals in mid and high frequency bands, and keep the feedback filter unchanged; or when the wearer of the earphone is in the motion state and there is strong wind noise in the low frequency band, weak wind noise in the mid frequency band and no wind noise in the high frequency band, adjust the coefficients of the feedforward filter to allow the feedforward filter to amplify the signal in the high frequency band only, and keep the feedback filter unchanged; or when the wearer of the earphone is in the motion state and there is strong wind noise in the mid frequency band, and weak wind noise or strong wind noise in the high frequency band, turn off the feedforward filter, and keep the feedback filter unchanged; or when the wearer of the earphone is in a non-motion state and there is strong wind noise in the low frequency band, turn off the feedforward filter, and keep the feedback filter unchanged.

B14. The signal processing device for an earphone of any one of claims B9 to B13, further including:

an environmental noise detection module configured to detect an energy magnitude of environmental noise by using the first microphone;

the noise cancellation control module further configured to consider the energy magnitude of the environmental noise when adjusting the operating modes of the feedforward filter and the feedback filter inside the earphone.

B15. The signal processing device for an earphone of claims B14, herein the environmental noise detection module is specifically configured to:

perform exponential smoothing on the frequency domain signal of the first microphone at any of frequency points, and take a minimum value of the smoothed signals within a set length of time to obtain the environmental noise signal of the frequency point in a current time frame; and superimpose the environmental noise signals of all the frequency points in the current time frame to obtain a total energy of the environmental noises.

B16. The signal processing device for an earphone of claims B14, herein the noise cancellation control module is also specifically configured to:

when the wearer of the earphone is in the motion state and there is no wind noise in the low frequency band, adjust the coefficients of the feedforward filter to allow the feedforward filter to amplify signals in mid and high frequency bands, and select, according to the energy magnitude of the environmental noise in the low frequency band, a feedforward filter and a feedback filter with appropriate noise cancellation levels, so that there is an appropriate level of noise cancellation in the low frequency band; or when the wearer of the earphone is in the non-motion state, and there is no wind noise or weak wind noise in the low frequency band, select a feedforward filter and a feedback filter with appropriate noise cancellation levels according to the energy magnitude of the environmental noise in the entire frequency bands, to perform noise cancellation on the entire frequency bands.

C17. An earphone, including: an acceleration sensor arranged inside the earphone, a first microphone and a second microphone both arranged outside the earphone, and a feedforward filter and a feedback filter inside the earphone; herein the earphone is further provided therein with the signal processing device for an earphone of any one of claims B9 to B16.

D18. A method for detecting wind noise, including:

acquiring, according to time domain signals collected by a first microphone and a second microphone arranged outside an earphone, frequency domain signals of the first microphone and the second microphone at each of frequency points;

dividing frequency bands of the signals into three frequency bands including a low frequency band, a mid frequency band and a high frequency band, and acquiring, according to the acquired frequency domain signals of the first microphone and the second microphone at each of frequency points, an average correlation of signals of the two microphones corresponding to each of the three frequency bands including the low frequency band, the mid frequency band and the high frequency band respectively, and an average energy of the signals of the first microphone corresponding to each of the three frequency bands; and determining, according to the acquired average correlations and average energies, whether there is wind noise in the three frequency bands, and intensities of the wind noise in the three frequency bands.

D19. The method for detecting wind noise of claim D18, herein determining, according to the acquired average correlations and average energies, whether there is wind noise in the three frequency bands, and the intensities of the wind noise in the three frequency bands includes:

for each frequency band, if the average correlation is less than a first correlation threshold, determining that there is strong wind noise in the frequency band responsive to the average energy being greater than a first energy threshold, determining that there is weak wind noise in the frequency band responsive to the average energy being less than the first energy threshold but greater than a second energy threshold, and determining that there is no wind noise in the frequency band responsive to the average energy being less than the second energy threshold;

for each frequency band, if the average correlation is greater than the first correlation threshold but less than a second correlation threshold, determining that there is weak wind noise in the frequency band responsive to the average energy being greater than the second energy threshold, and determining that there is no wind noise in the frequency band responsive to the average energy being less than the second energy threshold; and for each frequency band, if the average correlation is greater than the second correlation threshold, determining that there is no wind noise in the frequency band.

E20. A device for detecting wind noise, including:

a signal acquiring unit configured to acquire, according to time domain signals collected by a first microphone and a second microphone arranged outside an earphone, frequency domain signals of the first microphone and the second microphone at each of frequency points;

a frequency band dividing unit configured to divide frequency bands of the signals into three frequency bands including a low frequency band, a mid frequency band and a high frequency band;

an average correlation acquiring unit configured to acquire, according to the acquired frequency domain signals of the first microphone and the second microphone at each of frequency points, an average correlation of signals of the two microphones corresponding to each of the three frequency bands including the low frequency band, the mid frequency band and the high frequency band respectively;

an average energy acquiring unit configured to acquire, according to the acquired frequency domain signals of the first microphone and the second microphone at each of frequency points, an average energy of the signals of the first microphone corresponding to each of the three frequency bands including the low frequency band, the mid frequency band and the high frequency band respectively; and a wind noise determination unit configured to determine, according to the acquired average correlations and average energies, whether there is wind noise in the three frequency bands, and intensities of the wind noise in the three frequency bands.

E21. The device for detecting wind noise of claim E20, herein the wind noise determination unit is specifically configured to:

for each frequency band, if the average correlation is less than a first correlation threshold, determine that there is strong wind noise in the frequency band responsive to the average energy being greater than a first energy threshold, determine that there is weak wind noise in the frequency band responsive to the average energy being less than the first energy threshold but greater than a second energy threshold, and determine that there is no wind noise in the frequency band responsive to the average energy being less than the second energy threshold;

for each frequency band, if the average correlation is greater than the first correlation threshold but less than a second correlation threshold, determine that there is weak wind noise in the frequency band responsive to the average energy being greater than the second energy threshold, and determine that there is no wind noise in the frequency band responsive to the average energy being less than the second energy threshold; and for each frequency band, if the average correlation is greater than the second correlation threshold, determine that there is no wind noise in the frequency band.

What is claimed is:

1. A signal processing method for an earphone, comprising:
   detecting a motion state of a wearer of the earphone by using an acceleration sensor arranged inside the earphone;
   detecting wind noise conditions corresponding to different frequency bands by using a first microphone and a second microphone both arranged outside the earphone; and
   adjusting, according to the motion state of the wearer of the earphone and the wind noise conditions corresponding to different frequency bands, operating modes of a feedforward filter and a feedback filter inside the earphone, wherein the feedforward filter and the feedback filter are configured for active noise cancellation of the earphone,
   wherein the detecting the wind noise conditions corresponding to different frequency bands comprises:
   acquiring, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands, wherein the first microphone is a feedforward microphone and the second microphone is a talk microphone; and
   determining, according to the acquired average correlations and average energies, whether there is wind noise in the three frequency bands, and intensities of the wind noise in the three frequency bands.

2. The signal processing method for an earphone of claim 1, wherein the acquiring comprises:
   acquiring, according to time domain signals collected by the first microphone and the second microphone, frequency domain signals of the first microphone and the second microphone at each of frequency points; and
   dividing frequency bands of the signals into three frequency bands including a low frequency band, a mid frequency band and a high frequency band, and acquiring, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

3. The signal processing method for an earphone of claim 1, wherein the determining comprises:
   for each frequency band, if the average correlation is less than a first correlation threshold, determining that there is strong wind noise in the frequency band responsive to the average energy being greater than a first energy threshold, determining that there is weak wind noise in the frequency band responsive to the average energy being less than the first energy threshold but greater than a second energy threshold, and determining that there is no wind noise in the frequency band responsive to the average energy being less than the second energy threshold;
   for each frequency band, if the average correlation is greater than the first correlation threshold but less than a second correlation threshold, determining that there is weak wind noise in the frequency band responsive to the average energy being greater than the second energy threshold, and determining that there is no wind noise in the frequency band responsive to the average energy being less than the second energy threshold; and
   for each frequency band, if the average correlation is greater than the second correlation threshold, determining that there is no wind noise in the frequency band.

4. The signal processing method for an earphone of claim 1, wherein the adjusting comprises:
   when the wearer of the earphone is in the motion state and there is weak wind noise in the low frequency band, and no wind noise in the mid frequency band and the high frequency band, adjusting coefficients of the feedforward filter to allow the feedforward filter to amplify signals in mid and high frequency bands, and keeping the feedback filter unchanged; or
   when the wearer of the earphone is in the motion state and there is strong wind noise in the low frequency band, weak wind noise in the mid frequency band and no wind noise in the high frequency band, adjusting the coefficients of the feedforward filter to allow the feedforward filter to amplify the signal in the high frequency band only, and keeping the feedback filter unchanged; or
   when the wearer of the earphone is in the motion state and there is strong wind noise in the mid frequency band, and weak wind noise or strong wind noise in the high frequency band, turning off the feedforward filter, and keeping the feedback filter unchanged; or
   when the wearer of the earphone is in a non-motion state and there is strong wind noise in the low frequency band, turning off the feedforward filter, and keeping the feedback filter unchanged.

5. The signal processing method for an earphone of claim 1, further comprising: detecting an energy magnitude of environmental noise by using the first microphone, and considering the energy magnitude of the environmental noise when adjusting the operating modes of the feedforward filter and the feedback filter inside the earphone.

6. The signal processing method for an earphone of claim 5, wherein the detecting the energy magnitude of the environmental noise by using the first microphone comprises:
   performing exponential smoothing on the frequency domain signal of the first microphone at any of frequency points, and taking a minimum value of the smoothed signals within a set length of time to obtain the environmental noise signal of the frequency point in a current time frame; and superimposing the environmental noise signals of all the frequency points in the current time frame to obtain a total energy of the environmental noises.

7. The signal processing method for an earphone of claim 5, wherein the considering the energy magnitude of the environmental noise when adjusting the operating modes of the feedforward filter and the feedback filter inside the earphone comprises:

when the wearer of the earphone is in a motion state and there is no wind noise in the low frequency band, adjusting coefficients of the feedforward filter to allow the feedforward filter to amplify signals in mid and high frequency bands, and selecting, according to the energy magnitude of the environmental noise in the low frequency band, a feedforward filter and a feedback filter with appropriate noise cancellation levels so that there is an appropriate level of noise cancellation in the low frequency band; or when the wearer of the earphone is in the non-motion state and there is no wind noise or weak wind noise in the low frequency band, selecting a feedforward filter and a feedback filter with appropriate noise cancellation levels according to the energy magnitude of the environmental noise in the entire frequency bands, to perform noise cancellation on the entire frequency bands.

8. A signal processing device for an earphone, comprising:

a processor; and memory configured to store instructions executable by the processor, wherein the processor is configured to:

detect a motion state of a wearer of the earphone by using an acceleration sensor arranged inside the earphone;

detect wind noise conditions corresponding to different frequency bands by using a first microphone and a second microphone both arranged outside the earphone; and adjust, according to the motion state of the wearer of the earphone and the wind noise conditions corresponding to different frequency bands, operating modes of a feedforward filter and a feedback filter inside the earphone, wherein the feedforward filter and the feedback filter are configured for active noise cancellation of the earphone, wherein to detect the wind noise conditions corresponding to different frequency bands, the processor is further configured to:

acquire, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands, wherein the first microphone is a feedforward microphone and the second microphone is a talk microphone; and determine, according to the acquired average correlations and average energies, whether there is wind noise in the three frequency bands, and intensities of the wind noise in the three frequency bands.

9. The signal processing device for an earphone of claim 8, wherein to acquire, according to the signals collected by the first microphone and the second microphone, the average correlation of signals of the two microphones corresponding to each of the three frequency bands including the low frequency band, the mid frequency band and the high frequency band respectively, and the average energy of the signals of the first microphone corresponding to each of the three frequency bands, the processor is configured to:

acquire, according to time domain signals collected by the first microphone and the second microphone, frequency domain signals of the first microphone and the second microphone at each of frequency points; and divide frequency bands of the signals into three frequency bands including a low frequency band, a mid frequency band and a high frequency band, and acquire, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

10. The signal processing device for an earphone of claim 8, wherein to determine, according to the acquired average correlations and average energies, whether there is wind noise in the three frequency bands, and the intensities of the wind noise in the three frequency bands, the processor is configured to:

for each frequency band, if the average correlation is less than a first correlation threshold, determining that there is strong wind noise in the frequency band responsive to the average energy being greater than a first energy threshold, determine that there is weak wind noise in the frequency band responsive to the average energy being less than the first energy threshold but greater than a second energy threshold, and determine that there is no wind noise in the frequency band responsive to the average energy being less than the second energy threshold;

for each frequency band, if the average correlation is greater than the first correlation threshold but less than a second correlation threshold, determine that there is weak wind noise in the frequency band responsive to the average energy being greater than the second energy threshold, and determine that there is no wind noise in the frequency band responsive to the average energy being less than the second energy threshold; and for each frequency band, if the average correlation is greater than the second correlation threshold, determine that there is no wind noise in the frequency band.

11. The signal processing device for an earphone of claim 8, wherein to adjust, according to the motion state of the wearer of the earphone and the wind noise conditions corresponding to different frequency bands, the operating modes of the feedforward filter and the feedback filter inside the earphone, the processor is configured to:

when the wearer of the earphone is in the motion state and there is weak wind noise in the low frequency band, and no wind noise in the mid frequency band and the high frequency band, adjust coefficients of the feedforward filter to allow the feedforward filter to amplify signals in mid and high frequency bands, and keep the feedback filter unchanged; or when the wearer of the earphone is in the motion state and there is strong wind noise in the low frequency band, weak wind noise in the mid frequency band and no wind noise in the high frequency band, adjust the coefficients of the feedforward filter to allow the feedforward filter to amplify the signal in the high frequency band only, and keep the feedback filter unchanged; or when the wearer of the earphone is in the motion state and there is strong wind noise in the mid frequency band, and weak wind noise or strong wind noise in the high frequency band, turn off the feedforward filter, and keep the feedback filter unchanged; or when the wearer of the earphone is in a non-motion state and there is strong wind noise in the low frequency band, turn off the feedforward filter, and keep the feedback filter unchanged.

12. The signal processing device for an earphone of claim 8, wherein the processor is further configured to: detect an energy magnitude of environmental noise by using the first microphone, and consider the energy magnitude of the environmental noise when adjusting the operating modes of the feedforward filter and the feedback filter inside the earphone.

13. The signal processing device for an earphone of claim 12, wherein to detect the energy magnitude of the environmental noise by using the first microphone, the processor is configured to:

perform exponential smoothing on the frequency domain signal of the first microphone at any of frequency points, and take a minimum value of the smoothed signals within a set length of time to obtain the environmental noise signal of the frequency point in a current time frame; and superimpose the environmental noise signals of all the frequency points in the current time frame to obtain a total energy of the environmental noises.

14. The signal processing device for an earphone of claim 12, wherein to consider the energy magnitude of the environmental noise when adjusting the operating modes of the feedforward filter and the feedback filter inside the earphone, the processor is configured to:

when the wearer of the earphone is in the motion state and there is no wind noise in the low frequency band, adjust coefficients of the feedforward filter to allow the feedforward filter to amplify signals in mid and high frequency bands, and select, according to the energy magnitude of the environmental noise in the low frequency band, a feedforward filter and a feedback filter with appropriate noise cancellation levels so that there is an appropriate level of noise cancellation in the low frequency band; or when the wearer of the earphone is in the non-motion state, and there is no wind noise or weak wind noise in the low frequency band, select a feedforward filter and a feedback filter with appropriate noise cancellation levels according to the energy magnitude of the environmental noise in the entire frequency bands, to perform noise cancellation on the entire frequency bands.

15. An earphone, comprising: an acceleration sensor arranged inside the earphone, a first microphone and a second microphone both arranged outside the earphone, and a feedforward filter and a feedback filter inside the earphone, wherein the earphone is further provided therein with the signal processing device for an earphone of claim 8.

16. A non-transitory computer-readable storage medium having stored thereon instructions that, when executed by a processor, cause the processor to perform a signal processing method for an earphone, the method comprising:

detecting a motion state of a wearer of the earphone by using an acceleration sensor arranged inside the earphone;

detecting wind noise conditions corresponding to different frequency bands by using a first microphone and a second microphone both arranged outside the earphone; and adjusting, according to the motion state of the wearer of the earphone and the wind noise conditions corresponding to different frequency bands, operating modes of a feedforward filter and a feedback filter inside the earphone, wherein the feedforward filter and the feedback filter are configured for active noise cancellation of the earphone, wherein the detecting the wind noise conditions corresponding to different frequency bands comprises:

acquiring, according to signals collected by the first microphone and the second microphone, an average correlation of signals of the two microphones corresponding to each of three frequency bands including a low frequency band, a mid frequency band and a high frequency band respectively, and an average energy of the signals of the first microphone corresponding to each of the three frequency bands, wherein the first microphone is a feedforward microphone and the second microphone is a talk microphone; and determining, according to the acquired average correlations and average energies, whether there is wind noise in the three frequency bands, and intensities of the wind noise in the three frequency bands.

17. The non-transitory computer-readable storage medium of claim 16, wherein the acquiring comprises:

acquiring, according to time domain signals collected by the first microphone and the second microphone, frequency domain signals of the first microphone and the second microphone at each of frequency points; and dividing frequency bands of the signals into three frequency bands including a low frequency band, a mid frequency band and a high frequency band, and acquiring, according to the acquired frequency domain signals of the first microphone and the second microphone at each of frequency points, the average correlation of signals of the two microphones corresponding to each of the three frequency bands including the low frequency band, the mid frequency band and the high frequency band respectively, and the average energy of the signals of the first microphone corresponding to each of the three frequency bands.

* * * * *